(12) United States Patent  
Ogasawara et al.

(10) Patent No.: US 8,527,562 B2
(45) Date of Patent: Sep. 3, 2013

(54) FILE STORAGE SYSTEM AND STORAGE CONTROL METHOD

(75) Inventors: Hirokazu Ogasawara, Odawara (JP); Kenichi Miki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/087,119

(22) Filed: Apr. 14, 2011

(65) Prior Publication Data

US 2012/0215820 A1 Aug. 23, 2012

(30) Foreign Application Priority Data

Feb. 23, 2011 (JP) .................................. 2011-037169

(51) Int. Cl.
*G06F 12/00* (2006.01)
*G06F 17/30* (2006.01)

(52) U.S. Cl.
CPC ... *G06F 17/30067* (2013.01); *Y10S 707/99955* (2013.01)
USPC ...................... 707/823; 707/999.204; 707/821

(58) Field of Classification Search
USPC ........................................ 707/823, 999.204
See application file for complete search history.

(56) References Cited

U.S. PATENT DOCUMENTS

| 6,735,691 | B1* | 5/2004 | Capps et al. ....................... 713/1 |
| 7,213,114 | B2* | 5/2007 | Nakano et ....................... 711/162 |
| 7,430,648 | B2* | 9/2008 | Kasako et al. .................. 711/162 |
| 7,450,513 | B2* | 11/2008 | Okamura et al. ............. 370/235 |
| 7,484,238 | B2* | 1/2009 | Yamamoto et al. ............... 726/1 |
| 7,509,420 | B2* | 3/2009 | Moulton et al. .............. 709/226 |
| 7,586,854 | B2* | 9/2009 | Megarity et al. .............. 370/254 |
| 7,949,628 | B1* | 5/2011 | Blazek et al. .................. 707/600 |
| 2003/0065902 | A1* | 4/2003 | Shiga et al. .................... 711/170 |
| 2003/0220991 | A1* | 11/2003 | Soejima et al. ............... 709/221 |
| 2006/0129537 | A1 | 6/2006 | Torii et al. |
| 2007/0038748 | A1* | 2/2007 | Masuyama ................... 709/225 |

FOREIGN PATENT DOCUMENTS

JP 2006-164211 6/2006

* cited by examiner

*Primary Examiner* — Miranda Le
(74) *Attorney, Agent, or Firm* — Foley & Lardner LLP

(57) ABSTRACT

Three or more file storage apparatuses and a management computer coupled thereto construct a file storage system. The management computer stores therein migration path management information, which indicates a configuration of a migration path capable of including three or more file storage units arranged in a cascade form, and path history information, which indicates a change history of the configuration of the migration path. Each time when the configuration of the migration path is changed, the management computer updates the migration path management information to information that indicates the changed configuration of the migration path, and adds the information that indicates the changed configuration of the migration path, to the path history information.

8 Claims, 41 Drawing Sheets

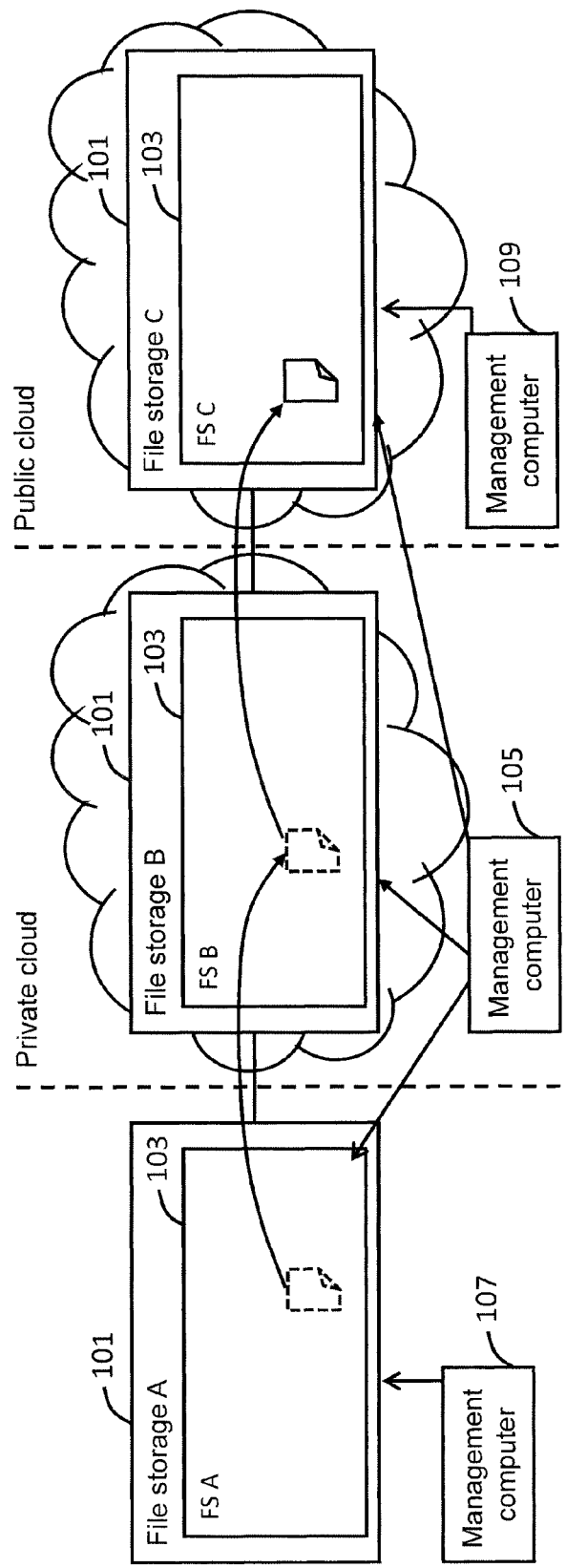

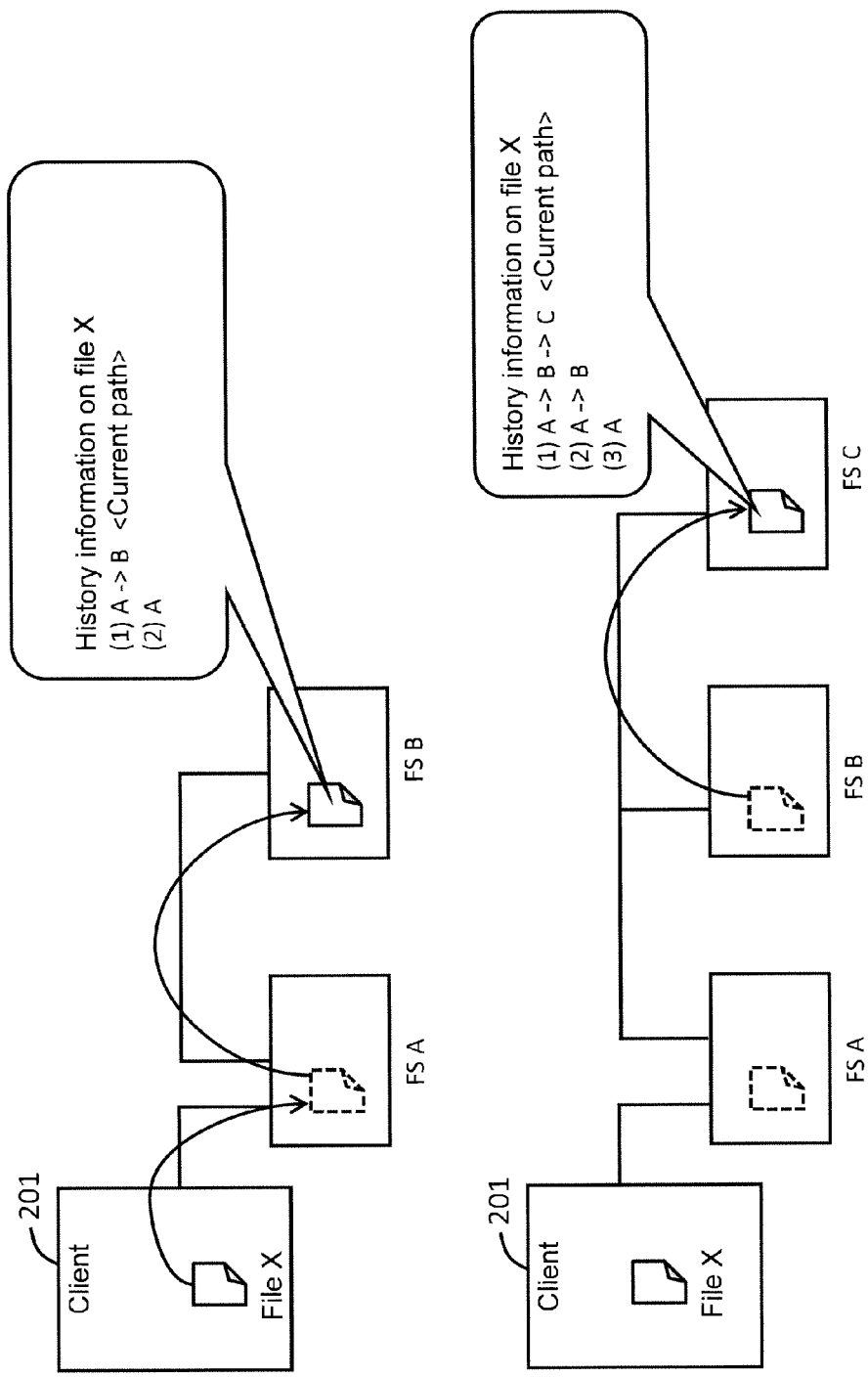

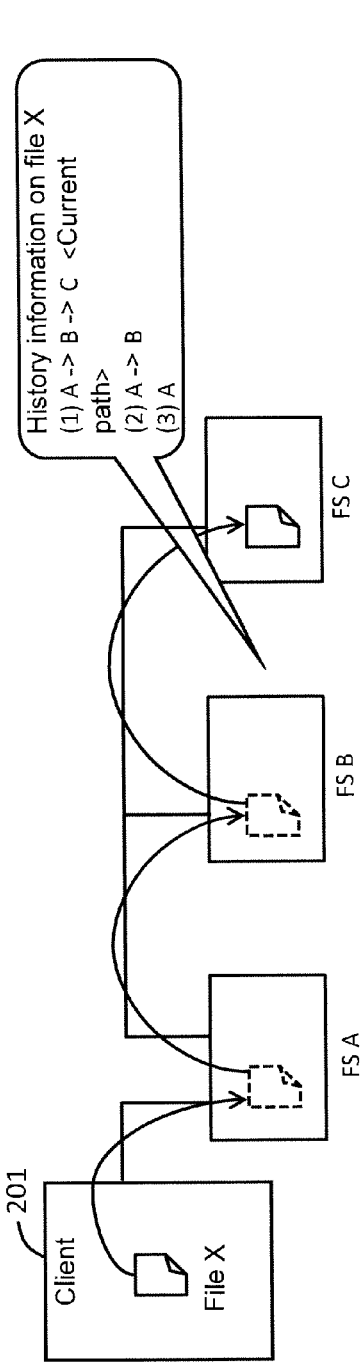
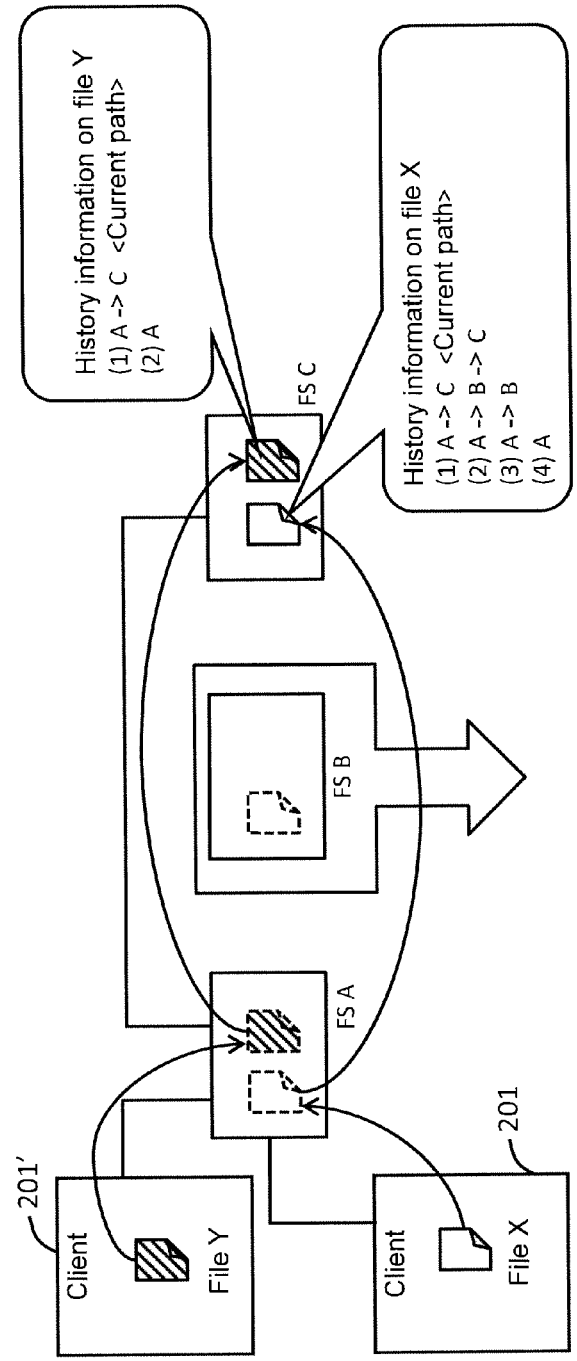
Fig. 4A
Fig. 4B

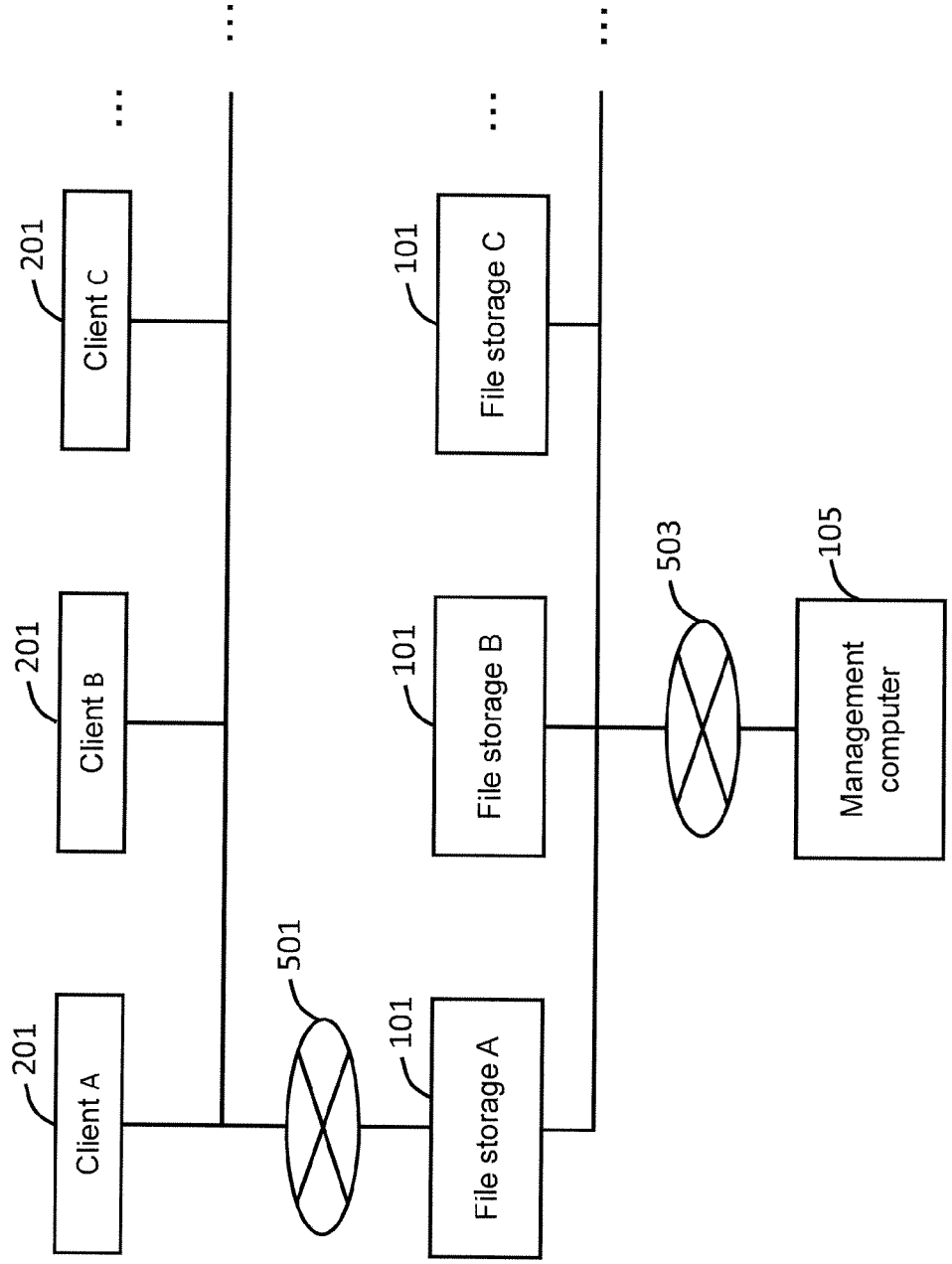

Fig. 7A

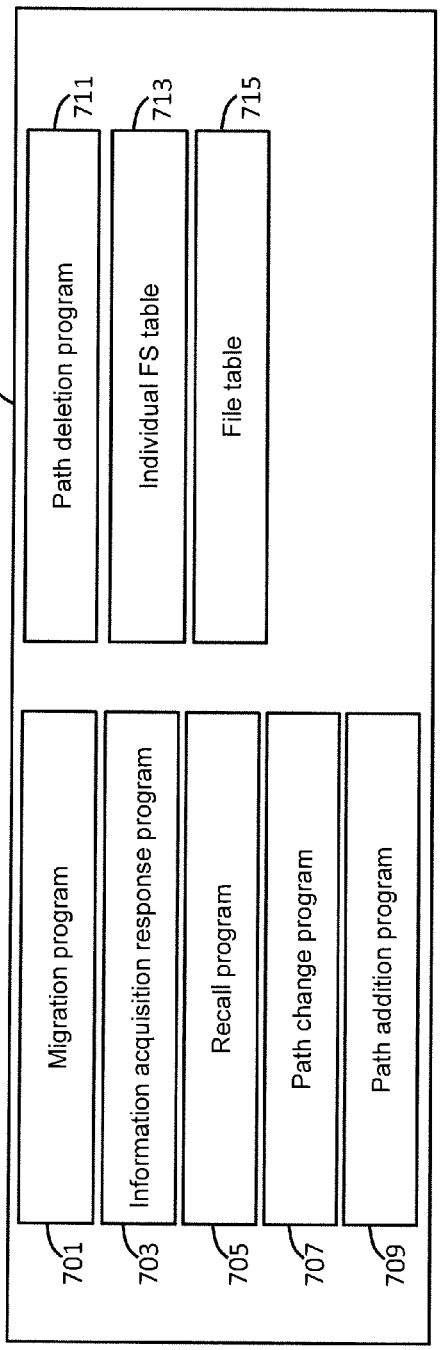

201

- 711 Path deletion program
- 713 Individual FS table
- 715 File table
- 701 Migration program
- 703 Information acquisition response program
- 705 Recall program
- 707 Path change program
- 709 Path addition program

Fig. 7B

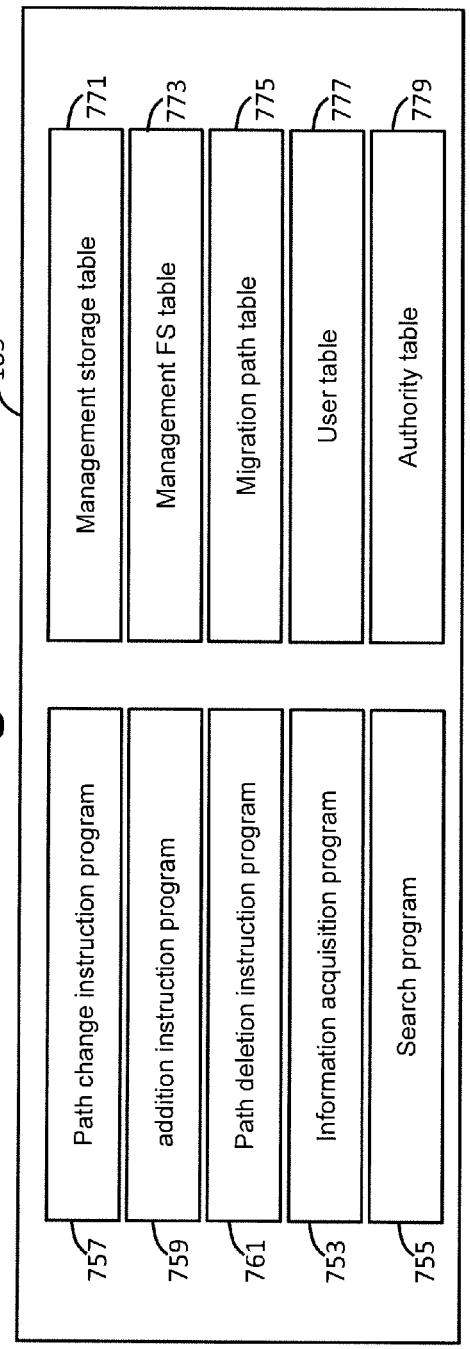

105

- 771 Management storage table
- 773 Management FS table
- 775 Migration path table
- 777 User table
- 779 Authority table
- 757 Path change instruction program
- 759 addition instruction program
- 761 Path deletion instruction program
- 753 Information acquisition program
- 755 Search program

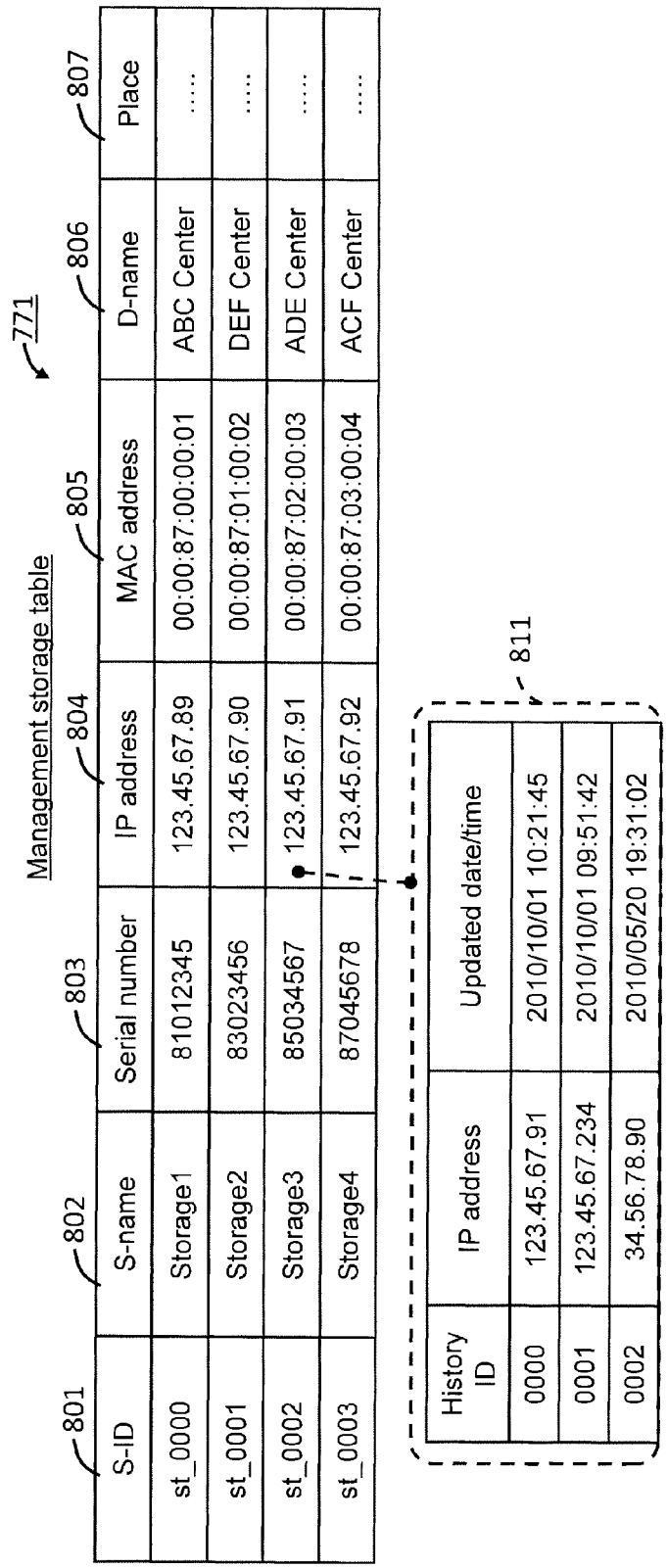

Fig. 10

Migration path table _775_

| MP-ID | Updated date/time | 1st FS | 2nd FS | 3rd FS | 4th FS |
|---|---|---|---|---|---|
| mp_0000 | 2010/10/03 10:24:33 | FS0000 | FS0002 | - | 4th FS |
| mp_0001 | 2010/07/12 12:33:05 | FS1001 | FS1002 | - | - |
| mp_0002 | 2009/12/21 23:51:02 | FS2001 | FS3001 | FS4001 | FS5001 |
| mp_0003 | 2002/08/17 07:39:28 | FS9001 | - | - | - |
| ... | | | | | |

_1011_

| History ID | Updated date/time | 1st FS | 2nd FS | 3rd FS | 4th FS |
|---|---|---|---|---|---|
| 000 | 2010/10/03 10:24:33 | FS0000 | FS0002 | - | - |
| 001 | 2009/08/01 22:41:50 | FS0000 | FS0001 | FS0002 | - |
| 002 | 2005/01/25 12:24:51 | FS0000 | FS0001 | - | - |
| 003 | 2001/02/28 19:31:02 | FS0000 | - | - | - |

Fig. 11A

User table 777

| User ID (1101) | User name (1102) | Password (1103) | Authority name (1104) | Remarks (1105) |
|---|---|---|---|---|
| u_0000 | root | ****** | root | Administrator of the entire system |
| u_0001 | siteA_admin | ****** | own site | Administrator of site A |
| u_0002 | siteB_admin | *** | all site | Administrator of site B |
| u_0003 | siteC_admin | ******* | latest own site | Administrator of site C |

Fig. 11B

Authority table 779

| Authority ID (1151) | Authority name (1152) | Migration path (1153) | | | Storage (1154) | | FS (1155) | | File (1156) | |
|---|---|---|---|---|---|---|---|---|---|---|
| | | R1 | R2 | Operation | R1 | R2 | R1 | R2 | R1 | R2 |
| pow_0000 | root | Yes | Yes | Yes | All | Yes | All | Yes | All | Yes |
| pow_0001 | own site | No | No | No | Only local | Yes | Only local | Yes | Only local | Yes |
| pow_0002 | all site | Yes | Yes | Yes | All | Yes | All | Yes | All | Yes |
| pow_0003 | latest own site | No | No | No | Only local | No | Only local | No | Only local | No |

Fig. 13

File table 715

| File ID 1301 | FS-name 1302 | Capacity 1303 | MGS IP address 1304 | MGS FS-name 1305 | MGD IP address 1306 |
|---|---|---|---|---|---|
| file_0001 | FS1001 | 10KB | 123.45.67.89 | FS0001 | 123.45.67.90 |
| file_0002 | FS1001 | 2KB | 123.45.67.89 | FS0002 | 123.45.67.91 |
| file_0003 | FS1001 | 3GB | - | - | 23.45.67.89 |
| file_0004 | FS1002 | 1KB | 34.56.78.90 | FS9001 | - |

| MGD FS-name 1307 | Stubbed date/time 1308 | Recalled date/time 1309 |
|---|---|---|
| FS2001 | 2009/11/04 13:29:31 | - |
| FS3001 | 2010/02/02 21:08:26 | - |
| FS8001 | - | 2010/10/05 14:41:55 |
| - | - | - |

Connected to 13-13

Fig. 14

| Hardware | Storage | Migration path | FS | File | User | Authority |
|---|---|---|---|---|---|---|
| Management computer | ○ | ○ | ○ | × | ○ | ○ |
| File storage | △ | ▲ | △ | ○ | × | × |

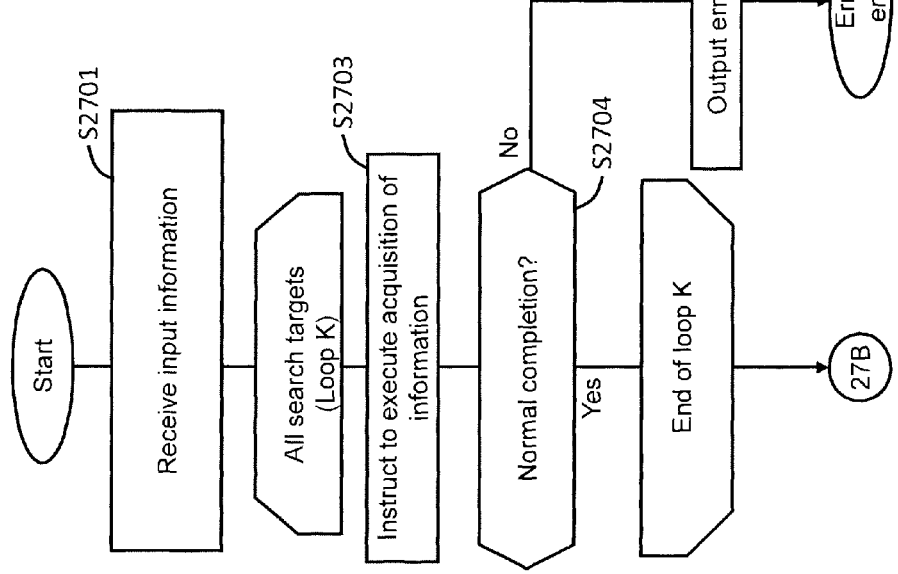
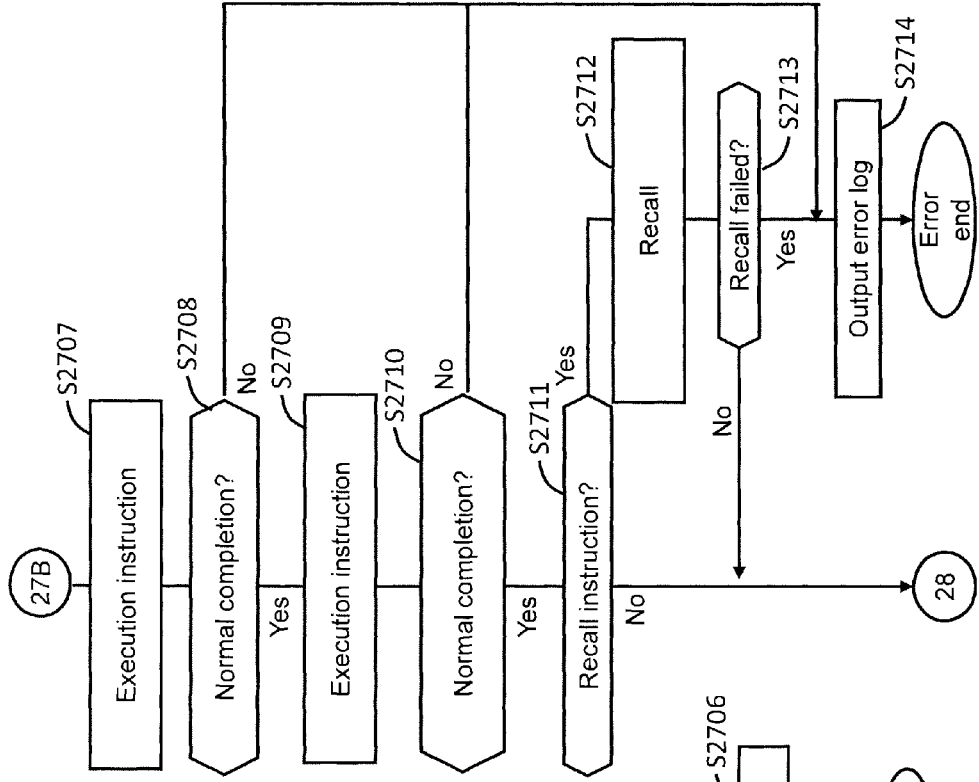
Fig. 27B
Fig. 27A

Fig. 34A

File table A

| File ID / 1301 | FS-name / 1302 | Capacity / 1303 | MGS IP address / 1304 | MGS FS-name / 1305 | MGD IP address / 1306 | MGD FS-name / 1307 | Stubbed date/time / 1308 | Recalled date/time / 1309 |
|---|---|---|---|---|---|---|---|---|
| file_0001 | FS1001 | 10KB | - | - | - | - | - | - |

Fig. 34B

File table A

| File ID / 1301 | FS-name / 1302 | Capacity / 1303 | MGS IP address / 1304 | MGS FS-name / 1305 | MGD IP address / 1306 | MGD FS-name / 1307 | Stubbed date/time / 1308 | Recalled date/time / 1309 |
|---|---|---|---|---|---|---|---|---|
| file_0001 | FS1001 | 10KB | - | - | 123.45.67.89 | FS2001 | - | - |

| History ID | IP address | Updated date/time |
|---|---|---|
| 0000 | 123.45.67.89 | 2011/01/01 00:00:00 |

Fig. 35A

File table A

| File ID | FS-name | Capacity | MGS IP address | MGS FS-name | MGD IP address | MGD FS-name | Stubbed date/time | Recalled date/time |
|---|---|---|---|---|---|---|---|---|
| 1301 | 1302 | 1303 | 1304 | 1305 | 1306 | 1307 | 1308 | 1309 |
| file_0001 | FS1001 | 10KB | - | - | 123.45.67.89 | FS2001 | 2011/01/01 01:00:00 | - |

| History ID | Stubbed date/time | Updated date/time |
|---|---|---|
| 0000 | 2011/01/01 01:00:00 | 2011/01/01 01:00:00 |

Fig. 35B

File table B

| File ID | FS-name | Capacity | MGS IP address | MGS FS-name | MGD IP address | MGD FS-name | Stubbed date/time | Recalled date/time |
|---|---|---|---|---|---|---|---|---|
| 1301 | 1302 | 1303 | 1304 | 1305 | 1306 | 1307 | 1308 | 1309 |
| file_0001 | FS2001 | 10KB | 123.45.67.10 | FS1001 | - | - | - | - |

Fig. 36A

File table A

| File ID | FS-name | Capacity | MGS IP address | MGS FS-name | MGD IP address | MGD FS-name | Stubbed date/time | Recalled date/time |
|---------|---------|----------|----------------|-------------|----------------|-------------|-------------------|--------------------|
|         | 1302    | 1303     | 1304           | 1305        | 1306           | 1307        | 1308              | 1309               |
| file_0001 | FS1001 | 10KB    | -              | -           | 123.45.67.89   | FS2001      | -                 | 2011/01/01 02:00:00 |

| History ID | Stubbed date/time | Updated date/time |
|------------|-------------------|-------------------|
| 0000       | -                 | -                 |
| 0001       | 2011/01/01 01:00:00 | 2011/01/01 01:00:00 |

| History ID | Stubbed date/time | Updated date/time |
|------------|-------------------|-------------------|
| 0000       | 2011/01/01 01:00:00 | 2011/01/01 02:00:00 |

Fig. 36B

File table B

| File ID | FS-name | Capacity | MGS IP address | MGS FS-name | MGD IP address | MGD FS-name | Stubbed date/time | Recalled date/time |
|---------|---------|----------|----------------|-------------|----------------|-------------|-------------------|--------------------|
|         | 1302    | 1303     | 1304           | 1305        | 1306           | 1307        | 1308              | 1309               |
| file_0001 | FS2001 | 10KB    | 123.45.67.10   | FS1001      | -              | -           | -                 | -                  |

Fig. 37A

File table A

| File ID | FS-name | Capacity | MGS IP address | MGS FS-name | MGD IP address | MGD FS-name | Stubbed date/time | Recalled date/time |
|---|---|---|---|---|---|---|---|---|
| file_0001 | FS1001 | 10KB | - | - | 123.45.67.89 | FS2001 | 2011/01/01 01:00:00 | - |

File table B

| File ID | FS-name | Capacity | MGS IP address | MGS FS-name | MGD IP address | MGD FS-name | Stubbed date/time | Recalled date/time |
|---|---|---|---|---|---|---|---|---|
| file_0001 | FS2001 | 10KB | 123.45.67.10 | FS1001 | 123.45.67.99 | FS3001 | - | - |

File table A

| File ID | FS-name | Capacity | MGS IP address | MGS FS-name | MGD IP address | MGD FS-name | Stubbed date/time | Recalled date/time |
|---|---|---|---|---|---|---|---|---|
| file_0001 | FS1001 | 10KB | - | - | 123.45.67.89 | FS2001 | 2011/01/01 01:00:00 | - |

Fig. 38B

File table B

| File ID | FS-name | Capacity | MGS IP address | MGS FS-name | MGD IP address | MGD FS-name | Stubbed date/time | Recalled date/time |
|---|---|---|---|---|---|---|---|---|
| file_0001 | FS2001 | 10KB | 123.45.67.10 | FS1001 | 123.45.67.99 | FS3001 | 2011/02/02 00:00:00 | - |

Fig. 38C

File table C

| File ID | FS-name | Capacity | MGS IP address | MGS FS-name | MGD IP address | MGD FS-name | Stubbed date/time | Recalled date/time |
|---|---|---|---|---|---|---|---|---|
| file_0001 | FS3001 | 10KB | 123.45.67.89 | FS2001 | - | - | - | - |

Fig. 39A

File table A

| File ID | FS-name | Capacity | MGS IP address | MGS FS-name | MGD IP address | MGD FS-name | Stubbed date/time | Recalled date/time |
|---|---|---|---|---|---|---|---|---|
| | 1302 | 1303 | 1304 | 1305 | 1306 | 1307 | 1308 | 1309 |
| file_0001 | FS1001 | 10KB | - | - | 123.45.67.89 | FS2001 | - | 2011/01/01 02:00:00 |

Fig. 39B

File table B

| File ID | FS-name | Capacity | MGS IP address | MGS FS-name | MGD IP address | MGD FS-name | Stubbed date/time | Recalled date/time |
|---|---|---|---|---|---|---|---|---|
| | 1302 | 1303 | 1304 | 1305 | 1306 | 1307 | 1308 | 1309 |
| file_0001 | FS2001 | 10KB | 123.45.67.10 | FS1001 | 123.45.67.99 | FS3001 | - | 2011/01/01 02:00:00 |

Fig. 39C

File table C

| File ID | FS-name | Capacity | MGS IP address | MGS FS-name | MGD IP address | MGD FS-name | Stubbed date/time | Recalled date/time |
|---|---|---|---|---|---|---|---|---|
| | 1302 | 1303 | 1304 | 1305 | 1306 | 1307 | 1308 | 1309 |
| file_0001 | FS3001 | 10KB | 123.45.67.89 | FS2001 | - | - | - | - |

Fig. 40A

| File ID (1301) | FS-name (1302) | Capacity (1303) | MGS IP address (1304) | MGS FS-name (1305) | MGD IP address (1306) | MGD FS-name (1307) | Stubbed date/time (1308) | Recalled date/time (1309) |
|---|---|---|---|---|---|---|---|---|
| file_0001 | FS1001 | 10KB | - | - | 123.45.67.99 | FS3001 | 2011/01/01 04:00:00 | - |

File table A

Fig. 40B

| File ID (1301) | FS-name (1302) | Capacity (1303) | MGS IP address (1304) | MGS FS-name (1305) | MGD IP address (1306) | MGD FS-name (1307) | Stubbed date/time (1308) | Recalled date/time (1309) |
|---|---|---|---|---|---|---|---|---|
| file_0001 | FS2001 | 10KB | 123.45.67.10 | FS1001 | 123.45.67.99 | FS3001 | 2011/01/01 02:00:00 | - |

File table B

Fig. 40C

| File ID (1301) | FS-name (1302) | Capacity (1303) | MGS IP address (1304) | MGS FS-name (1305) | MGD IP address (1306) | MGD FS-name (1307) | Stubbed date/time (1308) | Recalled date/time (1309) |
|---|---|---|---|---|---|---|---|---|
| file_0001 | FS3001 | 10KB | 123.45.67.10 | FS1001 | - | - | - | - |

File table C

Fig. 41A

| File ID 1301 | FS-name 1302 | Capacity 1303 | MGS IP address 1304 | MGS FS-name 1305 | MGD IP address 1306 | MGD FS-name 1307 | Stubbed date/time 1308 | Recalled date/time 1309 |
|---|---|---|---|---|---|---|---|---|
| file_0001 | FS1001 | 10KB | - | - | 123.45.67.89 | FS2001 | 2011/01/01 01:00:00 | - |

File table A

Fig. 41B

| File ID 1301 | FS-name 1302 | Capacity 1303 | MGS IP address 1304 | MGS FS-name 1305 | MGD IP address 1306 | MGD FS-name 1307 | Stubbed date/time 1308 | Recalled date/time 1309 |
|---|---|---|---|---|---|---|---|---|
| file_0001 | FS2001 | 10KB | 123.45.67.10 | FS1001 | - | - | - | 2011/05/05 05:00:00 |

File table B

Fig. 41C

| File ID 1301 | FS-name 1302 | Capacity 1303 | MGS IP address 1304 | MGS FS-name 1305 | MGD IP address 1306 | MGD FS-name 1307 | Stubbed date/time 1308 | Recalled date/time 1309 |
|---|---|---|---|---|---|---|---|---|
| file_0001 | FS3001 | 10KB | 123.45.67.89 | FS2001 | - | - | - | - |

File table C

FILE STORAGE SYSTEM AND STORAGE CONTROL METHOD

CROSS-REFERENCE TO PRIOR APPLICATION

This application relates to and claims the benefit of priority from Japanese Patent Application No. 2011-37169 filed on Feb. 23, 2011, the entire disclosure of which is incorporated herein by reference.

BACKGROUND

The present invention generally relates to storage control in a file storage system having a plurality of file storage apparatuses.

Generally, a file storage system has two file storage apparatuses ("file storages," hereinafter) related one-on-one to each other (Japanese Patent Application Publication No. 2006-164211). A first file storage migrates a file to be migrated, to a second file storage related to the first file storage, and generates a stub for the file to be migrated. The term "stub" means an object (e.g., metadatum) associated with information on a destination where the file is stored (information on a link). Upon reception of a read command on the file related to the stub from a client, the first file storage transmits the read command according to the link of the stub to the second file storage that has a file related to the stub. Consequently, the first file storage acquires the file related to the stub from the second file storage, and transmits this file to the client.

When migrated, the file may pass through a migration path. There are two nodes configuring the migration path. Each of the nodes may be a unit of storage. For example, one of the nodes may serve as a file system managed by the first file storage, and the other node may serve as a file system managed by the second file storage.

There is known a cloud storage, a storage system that provides an unspecified number of users with functions of a storage via a network. The cloud storage is often configured by a plurality of file storages.

When adopting the cloud storage as at least either a file migration source or a file migration destination, a file storage system might have three or more file storages.

In such file storage system, another node might be required as an intermediate node of the migration path, in addition to the both end nodes (the two nodes). According to such migration path, three or more file systems of the three or more file storages are in a cascade form, wherein files are migrated from a front end node (file system) to a terminal end node (file system) via the intermediate node (file system). The conventional file storage system described above, however, is configured only by the two file storages that are related one-on-one to each other. It is therefore difficult, according to the prior art, to construct a migration path having such intermediate node.

It is considered that the higher the number of file storages configuring a file storage system, the more complicated the configuration of a migration path and the higher the number of migration paths. Therefore, the management burden on an administrator of the file storage system is considered enormous. It is difficult to investigate, for example, what kind of file storage the files have passed through previously.

Such problems could happen not only in the file storage system having the cloud storage, but also in other file storage systems having three or more file storages.

SUMMARY

An object of the present invention is to be able to construct a migration path having an intermediate node in a file storage system that has three or more file storages, and to reduce the management burden on administrators.

The file storage system has three or more file storages and a management computer coupled to the three or more file storages.

The management computer stores therein migration path management information indicating a configuration of a migration path and path history information indicating a change history of the configuration of the migration path. The migration path can include three or more file storage units that are arranged in a cascade form.

Each time when the configuration of the migration path is changed, the management computer updates the migration path management information to information indicating the changed configuration of the migration path and adds this information indicating the changed configuration of the migration path to the path history information.

A variety of storage units can be adopted as the file storage units. For instance, file storage apparatus may be adopted as the file storage units, or file systems having the file storage apparatus may be adopted. The file systems are prepared based on one or more physical storage devices. The physical storage devices may be located inside or outside the file storage apparatus. Each of the physical storage devices may be, for example, a HDD (hard disk drive) or SSD (solid state drives).

BRIEF DESCRIPTION OF THE DRAWINGS

FIG. 1 shows an outline of an example of a configuration of a file storage system according to an embodiment of the present invention;

FIG. 2A shows an example obtained prior to addition of a migration path;

FIG. 2B shows an example obtained after the addition of the migration path;

FIG. 4A shows an example obtained prior to a change of a migration path;

FIG. 4B shows an example obtained after the change of the migration path;

FIG. 5 shows a configuration example of a computer system according to an embodiment of the present invention;

FIG. 7A shows an example of management information and computer programs that the file storage 101 has;

FIG. 7B shows an example of management information and computer programs that the management computer 105 has;

FIG. 8 shows a configuration example of a management storage table;

FIG. 10 shows a configuration example of a migration path table 775;

FIG. 11A shows a configuration example of a user table 777;

FIG. 11B shows a configuration example of an authority table 779;

FIG. 13 shows a configuration example of a file table 773;

FIG. 14 shows an example of a relation between the devices and the tables;

FIG. 27A shows a first part of an example of a flow of processes performed by a path change instruction program 757;

FIG. 27B shows a second part of the example of the flow of processes performed by the path change instruction program 757;

FIG. 34A shows a row corresponding to a file X in a file table A (the file table 715 of a file storage A) obtained in step 1 of FIG. 33;

FIG. 34B shows a row corresponding to the file X in the file table A obtained in step 2 of FIG. 33;

FIG. 35A shows a row corresponding to the file X in the file table A obtained in step 3 of FIG. 33;

FIG. 35B shows a row corresponding to a file X in a file table B (the file table 715 of a file storage B) obtained in step 3 of FIG. 33;

FIG. 36A shows rows corresponding to the file X in the file table A obtained in step 4 of FIG. 33;

FIG. 36B shows a row corresponding to the file X in the file table B obtained in step 4 of FIG. 33;

FIG. 37A shows a row corresponding to the file X in the file table A obtained in step 5 of FIG. 33;

FIG. 37B shows a row corresponding to the file X in the file table B obtained in step 5 of FIG. 33;

FIG. 38A shows a row corresponding to the file X in the file table A obtained in step 6 of FIG. 33;

FIG. 38B shows a row corresponding to the file X in the file table B obtained in step 6 of FIG. 33;

FIG. 38C shows a row corresponding to a file X in a file table C (the file table 715 of a file storage C) obtained in step 6 of FIG. 33;

FIG. 39A shows a row corresponding to the file X in the file table A obtained in step 7 of FIG. 33;

FIG. 39B shows a row corresponding to the file X in the file table B obtained in step 7 of FIG. 33;

FIG. 39C shows a row corresponding to the file X in the file table C obtained in step 7 of FIG. 33;

FIG. 40A shows a row corresponding to the file X in the file table A obtained in step 8 of FIG. 33;

FIG. 40B shows a row corresponding to the file X in the file table B obtained in step 8 of FIG. 33;

FIG. 40C shows a row corresponding to the file X in the file table C obtained in step 8 of FIG. 33;

FIG. 41A shows a row corresponding to the file X in the file table A obtained in step 9 of FIG. 33;

FIG. 41B shows a row corresponding to the file X in the file table B obtained in step 9 of FIG. 33; and FIG. 41C shows a row corresponding to the file X in the file table C obtained in step 9 of FIG. 33.

DETAILED DESCRIPTION OF THE EMBODIMENT

Figure 3A:
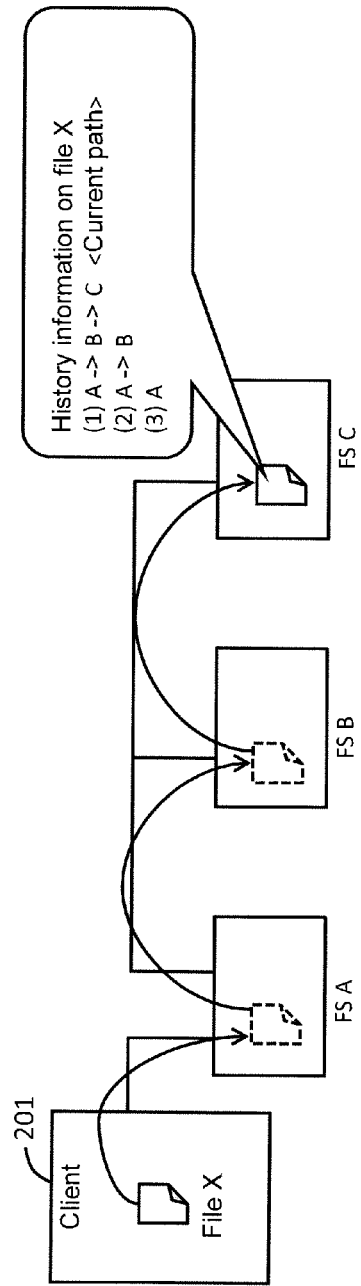
FIG. 3A shows an example obtained prior to deletion of a migration path.

An embodiment of the present invention is now described hereinbelow with reference to the drawings.

Note in the following description that various information are described using "xxx table;" however, the various information may be expressed in terms of a data structure other than tables. Such expression as "xxx table" can be referred to as "xxx information" to describe that the various information are independent of the data structure.

Moreover, in the following description, IDs (identifiers), names, or numbers are used for specifying elements (e.g., file storages, migration paths, or file systems); however, a combination of two or more of these IDs, names, or numbers as well as various other information may be used as identification information.

In the following description, a combination of an element name and an identification code is used in place of a combination of an element name and a reference numeral, in order to explain the differences among the similar elements. For instance, a file storage 101 with an identification code "A" is often described as "file storage A."

In the following description, each process is described using "program" as the subject of the sentence. The program is executed by a processor (e.g., a CPU (Central Processing Unit)) included in a controller, so that a predetermined process is performed by appropriately using a storage resource (e.g., a memory) and/or a communication interface device (e.g., a communication port). Thus, the subject of the sentence describing each process may be the "processor." The process that is described using the program as the subject of the sentence may be performed by a file storage, a controller of the file storage, a management computer, or a controller of the management computer. The controllers may include a hardware circuit for performing part or all of processes performed in place of or along with the processor. The computer program may be installed from a program source into each file storage or the management computer. The program source may be a storage medium that can be read by, for example, a program distribution server or a computer.

The management computer may be configured by one or more computers. Specifically, when the management computer displays information or transmits display information to a remote computer, the management computer may be configured by a single computer. For example, when a function equivalent to the management computer is realized by a plurality of computers, the plurality of computers (may include a display computer when the information is displayed using the display computer) correspond to the management computer.

Also, in the following description, an expression "date/time" is used, which may represent information on a year, month and date, or, needless to say, an hour, minute and second (including a number representing the second after the decimal point).

In the following description, when the similar elements (e.g., file storages, file systems) are not differentiated from one another, these similar elements are described using reference numerals. When the similar elements are differentiated from one another, identification codes are often used in place of the reference numerals. For instance, when a plurality of file systems are not differentiated from one another, these file systems are collectively called "file system 103." When differentiated, each of these file systems is often referred to as "file system A," "file system B," or the like.

In addition, the term "file system" used in the diagrams is abbreviated to "FS."

FIG. 1 shows an outline of an example of a configuration of a file storage system according to an embodiment of the present invention.

A file storage system has three or more file storages 101, to which a management computer 105 is coupled. Each of the file storages 101 has one or more file systems 103. As shown by the example in FIG. 1, the three or more file storages include, respectively, a local file storage A, a file storage B serving as a private cloud storage, and a file storage C serving as a public cloud storage. The file storage A has a file system A, and the file storage B has a file system B. The file storage C has a file system C.

Here, the term "file storage" means a storage apparatus such as a NAS (Network Attached Storage) for storing files therein. At least one of the file systems 103 is based on at least one physical storage device ("PDEV," hereinafter). The PDEV is, for example, a HDD (hard disk drive) or SSD (solid state drive). The PDEV may be located inside or outside each file storage. In the description of the present embodiment, the term "file system" means a storage space in which files are stored.

The term "local file storage" means a file storage activated or managed by a user. The local file storage may be managed individually by a management computer 107 that is used by an administrator of the user.

The term "public cloud storage" means a file storage activated or managed by an organization different from the user. Generally, the public cloud storage is accessed by an unspecified number of users using the Internet. For example, the public cloud storage may be managed individually by a management computer 109 that is used by an administrator of the organization different from the user.

The term "private cloud storage" means a file storage activated or managed by the same organization as the user.

In the present embodiment, a file storage unit (e.g., the file systems 103 and/or the file storages 101) is often added, deleted or replaced. A configuration of a migration path might be added, deleted, or changed accordingly.

In the present embodiment, "migration path" can have one or more intermediate nodes in addition to both end nodes. Therefore, in the present embodiment, the migration path can include three or more nodes arranged in a cascade form. Various storage units (e.g., file systems, a file system group configured by two or more file systems, file storages, a storage group configured by two or more file storages) can be adopted as the "nodes." In the present embodiment, the nodes are the file systems. Two or more file systems out of the plurality of file systems configuring the migration path may exist in the same file storage. For example, when a single migration path is configured by a first file system and a second file system, a single file storage may have the first file system and the second file system.

Each of the file storages 101 has the following functions:
(1) Specifying, on a regular or irregular basis, a file to be migrated (e.g., a file complying with a predetermined migration condition), from the file system 103 of the file storage 101;
(2) Migrating the specified file to a subsequent file system on the terminal end side, which is logically coupled to the file system 103 (a subsequent file system on the terminal end side of the same migration path); and
(3) Creating a stub for the migrated file (a stub simulating a link of the abovementioned subsequent file system).

As described above, the management computer 105 is coupled to all of the file storages configuring the file storage system (the file storages A, B and C in the example shown in FIG. 1). The management computer 105 manages the file storage system. Specifically, for example, the management computer 105 keeps information indicating a change history of a configuration of the migration path ("migration path history information," hereinafter). Each of the file storages 101 keeps information indicating a migration history of a file ("file history information," hereinafter). In response to an input of a search condition, the management computer 105 can search for information complying with the input search condition on the basis of the migration path history information and information based on the file history information acquired from the file storages 101, and output the searched information (search result).

An example of adding, deleting and changing migration paths is described hereinafter with reference to FIGS. 2A to 4B. In the following description, as shown in FIG. 1, the file storage A has the file system A, the file storage B has the file system B, and the file storage C has the file system C.

FIG. 2A shows an example obtained prior to addition of a migration path. FIG. 2B shows an example obtained after the addition of the migration path.

The expression "addition of a migration path" means that a new node (file system) is added to a terminal end node (file system) of the migration path. Therefore, the newly added node becomes the terminal end of the migration path, and the node that was the terminal end prior to the addition becomes the intermediate node of the migration path.

In other words, for example, there is the file system A that stores a file X transmitted from a client 201, as shown in FIG. 2A. In this situation, the file storage A has information that includes history information indicating that the file X is stored in the file system A. This information is the history information of the file X.

In this situation, suppose that the file system B is added to the file system A. Subsequently, the file X is supposedly migrated from the file system A to the file system B, and a stub is generated in the file storage A to simulate a link of the file X of the file system B. In this case, the file storage B adds, to the history information of the file X, information indicating that the file X passes through the migration path extending from the file system A to the file system B.

Suppose that, thereafter, a migration path is added, as shown in FIG. 2B. In other words, suppose that a new file system C is added to the file system B, which is the terminal end node. As a result, the terminal end node becomes the file system C, not the file system B.

History information indicating the addition of the migration path (history information indicating that the file system C is added as the terminal end node of the migration path composed of the file systems A and B) is added to the management computer 105.

Next, suppose that the file X is migrated from the file system B to the file system C, and that a stub is generated in the file storage B to simulate a link of the file X of the file system C. In this case, the link of the stub kept in the file storage A is the stub created in the file storage B. The file storage C adds, to the history information of the file X, information indicating that the file X passes through the migration path from the file system A to the file system C via the file system B.

The history information of the file X are kept individually in the file storages A, B and C. The history information of the file X differ from one another in the file storages 101.

The management computer 105 can acquire the history information of the file X from each of the file storages A, B and C, and, based on these information, specify the migration path of a certain configuration through which the file X has passed in the past. For instance, the management computer 105 can specify that the components of the migration path, through which the file X passes, increase from the file systems A and B to the file systems A, B and C.

The above has described the outline of the example of adding the migration paths. A migration path may be added for the purpose of, for example, adding a total capacity of the migration path. Note that adding a new node to the middle of the migration path (between a node and another node) may also be an example of "addition of a migration path."

Figure 3B:
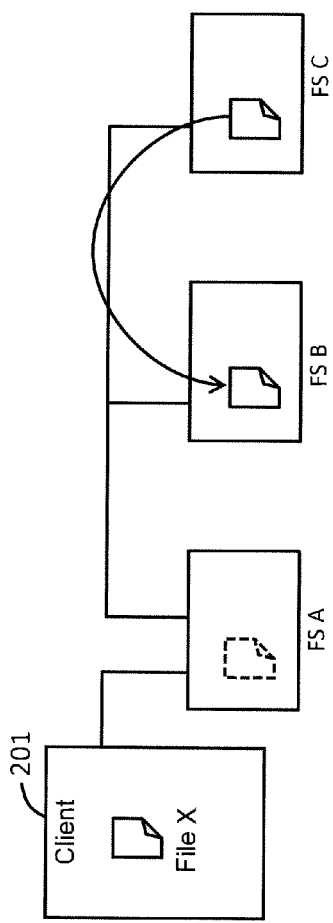
FIG. 3B shows an example of a process performed when a file storage C is deleted from the file storage system.
Figure 3C:
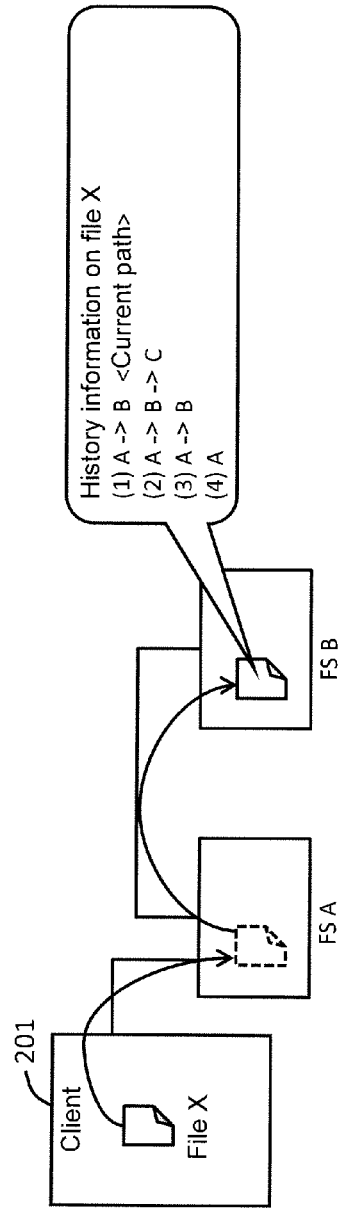
FIG. 3C shows an example obtained after the deletion of the migration path.

FIG. 3A shows an example obtained prior to deletion of a migration path. FIG. 3B shows an example of a process performed when the file storage C is deleted from the file storage system. FIG. 3C shows an example obtained after the deletion of the migration path.

The expression "deletion of a migration path" means that the terminal end node (file system) of a migration path is deleted from the migration path. Therefore, a node proximal to the deleted terminal end node becomes a new terminal end node of the migration path.

More specifically, for example, suppose that the file storage C in the situation shown in FIG. 3A (same as the situation shown in FIG. 2B) is deleted from the file storage system as shown in FIG. 3B.

In this case, a recall of the file X within the file system C takes place. In other words, the file storage B that has the stub simulating the link of the file X reads the file X from the file system C and deletes this stub. The file storage B then adds, to the history information of the file X, information indicating that the file X passes through the migration path extending from the file system A to the file system B.

The management computer 105 can acquire the history information of the file X from each of the file storages A, B and C, and, based on these information, specify that the components of the migration path, through which the file X passes, decrease from the file systems A, B and C to the file systems A and B.

The above has described the outline of the example of deleting a migration path. A migration path may be deleted by, for example, separating the file system on the terminal end of the current migration path so that data are not transferred. This may be performed in order to, for example, improve the access performance in the migration path. The examples shown in FIGS. 3A to 3C can assume that the file storage C is removed due to, for example, a problem in the file storage C. In this case, the administrator can input the identification information of the file storage C into the management computer 105, as a keyword (search condition), so that the management computer 105 can specify a file that was stored in the file system of the file storage C in the past, from the file storage system where the file storage C no longer exists. The details about this searching are described hereinafter.

FIG. 4A shows an example obtained prior to a change of a migration path. FIG. 4B shows an example obtained after the change of the migration path.

The expression "a change of a migration path" means that the intermediate node (file system) of a migration path is deleted from the migration path.

More specifically, for example, as shown in FIG. 4B, the file storage B in the situation shown in FIG. 4A (same as the situation shown in FIG. 2B) is deleted from the file storage system.

In this case, the link that is simulated by the stub kept in the file storage A is changed from the stub kept in the file storage B to the file X within the file system C. In addition, the file storage C adds, to the history information of the file X, information indicating that the file X passes through the migration path extending from the file system A to the file system C (the migration path without the file system B). If the file X is stored in the file system B, the file storage A carries out a recall of the file X (reads the file X from the file system B). Consequently, the file X is migrated from the file system A to the file system C. This is because the file system to which the file X is migrated from the file system A is changed from the file system B to the file system C.

In a case where a file Y is stored in the file system A after changing the migration path, the file storage A adds, to history information of the file Y, information indicating that the file Y is stored in the file system A. Subsequently, the file Y is migrated from the file system A to the file system C, and a stub for the file Y is kept in the file storage A. The file storage C then adds, to the history information of the file Y, information indicating that the file Y passes through the migration path extending from the file system A to the file system C (the migration path without the file system B).

The management computer 105 can acquire the history information of the file X from each of the file storages A, B and C, and, based on these information, specify that the components of the migration path, through which the file X passes, increase from the file systems A, B and C to the file systems A and C.

The above has described the outline of the example of a change of a migration path. The migration path may be changed by removing the intermediate node from the current migration path so as to reduce the number of migration hierarchies up to the file (actual data). This may be performed when shortening the path to improve the access performance or when separating a file system to replace the file storages 101 or due to failure of the file storages 101.

The present embodiment is described hereinafter in more detail.

FIG. 5 shows a configuration example of a computer system according to an embodiment of the present invention.

A plurality of (or one) clients 201 and one file storage A are coupled to a first communication network 501. The clients 201 represent computers (e.g., personal computers). Of the plurality of file storages 101, the file storage A receives an I/O (Input/Output) command (e.g., a write command or a read command) designating a file, from the clients 201.

The file storage A is coupled to at least another file storage 101. The file storage A migrates a file stored in the file system of the file storage A to a migration destination file system corresponding to the file system (the next file system), in accordance with the migration path including the file system of the file storage A (same is true for the other file storages 101).

The plurality of file storages 101 and the management computer 105 are coupled to a second communication network 503. The management computer 105 can communicate with the file storages 101 via the second communication network 503.

The configuration shown in FIG. 5 is merely an example. All of the file storages 101 may be able to communicate with all of the clients 201. Alternatively, one of the file storages 101 may be able to communicate with the rest of the file storages 101. Also, one of the file storages 101 may be able to communicate with only a specific file storage 101.

Figure 6A:
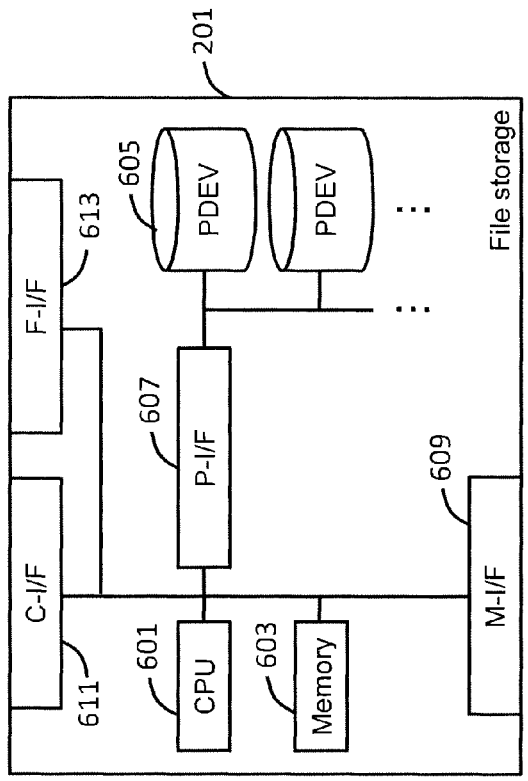
FIG. 6A shows an example of a hardware configuration of a file storage 101.

FIG. 6A shows an example of a hardware configuration of one of the file storages 101. Note, in the following description, that a communication interface device is abbreviated as "I/F."

The file storage 101 has I/Fs, storage resources, and a controller coupled to the I/Fs and the storage resources.

Examples of the I/Fs include an I/F used for communicating with the clients 201 (C-I/F) 611, an I/F used for communicating with the other file storages 101 (F-I/F) 613, an I/F used for communicating with the management computer 105 (M-I/F) 609, and an I/F used for communicating with PDEVs 605 (P-I/F) 607. Two or more of these I/Fs may be integrated.

Examples of the storage resources include a memory 603 and at least one of the plurality of PDEVs 605.

The controller includes a CPU (Central Processing Unit) 601. The controller may also include a hardware circuit for performing part of processes carried out by the CPU 601.

Figure 6B:
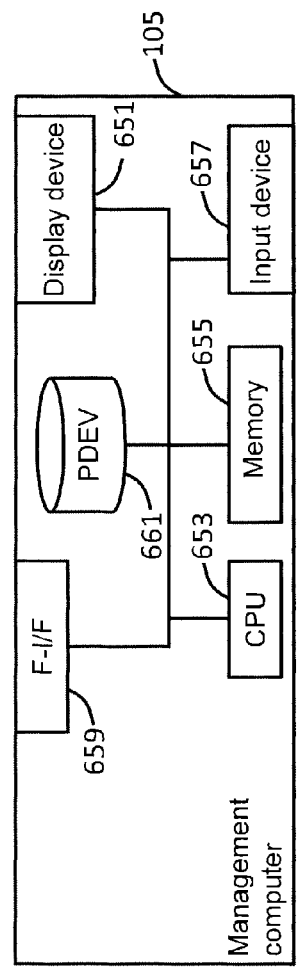
FIG. 6B shows an example of a hardware configuration of a management computer 105.

FIG. 6B shows an example of a hardware configuration of the management computer 105.

The management computing system 105 has an I/F, a storage resource, an input device 657, a display device 651, and a controller coupled to these components.

The I/F is, for example, an I/F used for communicating with the file storage 101 (F-I/F) 659.

The storage resource includes, for example, at least either a memory 655 or a PDVEV 661.

The input device 657 may be at least one of, for example, a keyboard, a pointing device, and a microphone. The display device 651 may be, for example, a liquid crystal display. The input device 657 and the display device 651 may be integrated (e.g., as a touch-panel display).

The controller includes a CPU 653. The controller may also include a hardware circuit for performing part of processes carried out by the CPU 653.

FIG. 7A shows an example of management information and computer programs that the file storage 101 has.

The storage resources of the file storage 101 store, for example, the following programs as the computer programs:

A migration program 701 for migrating files;

An information acquisition response program 703 for transmitting information to the management computer 105;

A recall program 705 for performing a recall of a file;

A path change program 707 for changing a migration path;

A path addition program 709 for adding a migration path; and

A path deletion program 711 for deleting a migration path.

The storage resources also store, for example, the following information as the management information:

An individual file system table 713 having information on the file system of this file storage 101;

A file table 715 having information on the files of this file storage 101; and A history table (not shown) showing change histories of predetermined types of information that the tables 713 and 715 have.

The history table has, for example, information indicating a change history of a migration destination (file system) and/or a migration source (file system) to and/or from which files are migrated.

FIG. 7B shows an example of management information and computer programs that the management computer 105 has.

The storage resource of the management computer 105 stores, for example, the following programs as the computer programs:

A path change instruction program 757 for instructing to change a migration path;

A path addition instruction program 759 for instructing to add a migration path;

A path deletion instruction program 761 for instructing to delete a migration path;

An information acquisition program 753 for acquiring part or all of the management information from the file storage 101; and A search program 755 for searching for information.

The storage resource also stores, for example, the following information as the management information:

A management storage table 771 having information on the plurality of file storages 101;

A management file system table 773 having information on the plurality of file systems 103 that the plurality of file storages 101 have, respectively;

A migration path table 755 having information on a migration path;

A user table 777 having information on the user (administrator);

An authority table 779 having information on an authority; and

A history table (not shown) showing change histories of predetermined types of information that the tables 771, 773, 775, 777 and 779 have.

In the history table, at least information on a change history of the configuration of each migration path is present for each migration path.

These various tables are described next. Note, in the following description, that the elements (e.g., the file storages and file systems) are appropriately described using the IDs, names and the like.

FIG. 8 shows a configuration example of the management storage table.

The management storage table 771 has the following information for each of the file storages 101 included in the file storage system:

Identification information (S-ID) 801 of each file storage 101;

Information (S-name) 802 indicating the name of the file storage 101;

Information (serial number) 803 indicating a manufacturing number of the file storage 101;

Information (IP address) 804 indicating an IP address of the file storage 101;

Information (MAC address) 805 indicating a MAC address of the file storage 101;

Information (D-name) 806 indicating the name of a data center in which the file storage 101 is installed; and Information (Place) 807 indicating a physical position (e.g., an address) where the file storage 101 is installed.

The management computer 105 can also have a history table for at least one type of information out of the above-mentioned information 801 to 807 (a table showing an update history of the information). For instance, according to a history table 811 showing an update history of the IP address 804 corresponding to a file storage "st_0002" as shown in FIG. 8, it is clear that:

The current IP address 804, "123.45.67.91," was recorded at 10:21:45 on Oct. 1, 2010; and that The IP address 804 was updated twice since the first recording of the IP address 804.

Note that the history table may be updated (adding new history information to the history table) at the time of changing the configuration of each migration path (adding, deleting and changing the migration paths). Furthermore, instead of or in addition to that time, the management computer 105 may acquire the information from each file storage on a regular (or irregular) basis, and update the history table based on the acquired information. These moments can be applied to at least one of the history tables that the management computer 105 has.

Figure 9:
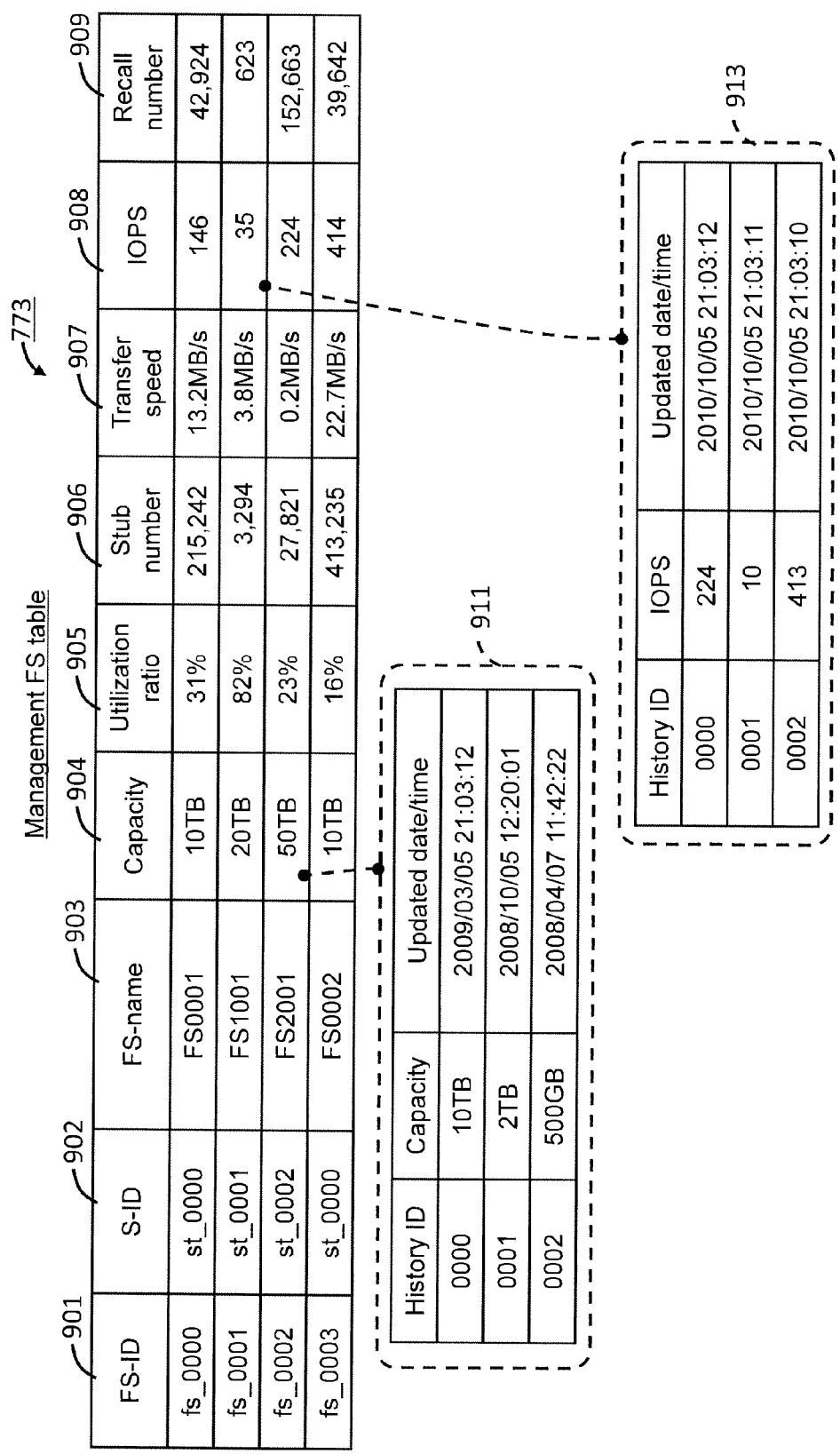
FIG. 9 shows a configuration example of a management file system table 773.

FIG. 9 shows a configuration example of the management file system table 773.

The management file system table 773 has the following information for each of the file systems 103 included in the file storage system:

Identification information (F-ID) 901 of each file system 103;

An S-ID 902 of the file storage 101 having this file system 103;

Information (FS-name) 903 indicating the name of the file system 103;

Information (capacity) 904 indicating the capacity of the file system 103;

Information (utilization ratio) 905 indicating the utilization ratio of the file system 103 (the ratio of the data in the capacity of the file system 103);

Information (stub number) 906 indicating the number of stubs (stub files) used by the file system 103;

Information (transfer speed) 907 indicating a transfer speed of the file system 103 (the amount of data input/output to/from the file system 103 per unit time);

Information (IOPS) 908 indicating the number of I/O commands that are input/output to/from the file system 103 per unit time (e.g., in one second); and Information (recall number) 909 indicating a total number of files recalled to the file system 103.

The word "TB" in the capacity 904 section is an abbreviation of "terabyte." The word "MB" in the transfer speed 907 section is an abbreviation of "megabyte," and "s" an abbreviation of "second."

The management computer 105 can have a history table for at least one type of information of the above-mentioned information 901 to 909 (a table showing an update history of the information). For example, FIG. 9 shows a history table 911 showing the update histories of the capacity 904, and a history table 913 showing the update histories of the IOPS 908. For example, according to the history table 911 that shows an update history of the capacity 904 corresponding to a file system "fs_0003" as shown in FIG. 9, it is clear that:

The current capacity 904 "10TB" was recorded at 21:03:12 on Mar. 5, 2009; and that The capacity 904 was updated twice since the first recording of the capacity 904.

FIG. 10 shows a configuration example of the migration path table 775.

The migration path table 775 has the following information for each of the migration paths:

Migration path identification information (MP-ID) 1001;

Information (updated date/time) 1002 indicating the date/time for the latest change in the configuration of each migration path; and Information ($1^{st}$ FS, $2^{nd}$ FS, . . . ) 1003-1, 1003-2, indicating the names of all of the file systems (N file systems) configuring the migration path.

The number of FS 1003 is dependent on the number of file systems configuring the migration path.

The management computer 105 has a history table showing changes in the configurations of the migration paths (addition, deletion and change of the migration paths). For example, a history table 1011 shown in FIG. 10 shows a history of changes in the configuration of a migration path "mp_0000." According to this history table 1011, for example, it is clear that:

The configuration of the current migration path was recorded at 10:24:33 on Oct. 3, 2010;

The migration path was configured only by a file system "FS0000" at first;

Then a migration path was added, forming the configuration (flow) of the migration path into a path of file system "FS0000"→file system "FS0001";

A migration path was further added, forming the configuration (flow) of the migration path into a path of file system "FS0000"→file system "FS0001"→file system "FS0002"; and that The migration path was changed (the file system "FS0001," the intermediate node, was removed), forming the configuration (flow) of the migration path into a path of file system "FS0000"→file system "FS0002."

The left-hand side of each arrow "→" indicates the migration source, whereas the right-hand side of the arrow "→" indicates the migration destination.

FIG. 11A shows a configuration example of the user table 777.

The user table 777 has the following information for each user (administrator):

User identification information (user ID) 1101;

Information (user name) 1102 indicating the name of each user;

Information (password) 1103 indicating a password of the user;

Information (authority name) 1104 indicating the name of the authority of the user; and Information (remarks) 1105 indicating remarks.

The remarks 1105 section represents the types of the users, i.e., whether each user is the administrator of the entire file storage system or the administrator of the file storage in a certain site (e.g., the data center).

The user (administrator) of each site can perform searching using the search program 755 on the management computer 105, and restrict the extent that the information can be acquired, by adjusting the authority of the user. Although not shown, there may be a history table for at least one type of information out of the information 1101 to 1105 (a table showing an update history of the information).

FIG. 11B shows a configuration example of the authority table 779.

The authority table 779 has the following information for each authority:

Authority identification information (authority ID) 1151;

Information (authority name) 1152 indicating the name of each authority;

Information (migration path) 1153 indicating restrictions on the migration path table 775;

Information (storage) 1154 indicating restrictions on the management storage table 771;

Information (FS) 1155 indicating restrictions on the management file system table 773 and the individual file system table 713; and Information (file) 1156 indicating restrictions on the file table 773.

Here, the word "R1" in the diagram represents whether each user can refer to the migration path table itself. The word "Yes" means that the user can refer to the table, and "No" means that the user cannot refer to the table.

The word "R2" in the diagram represents a flag indicating whether the user can refer to the history table showing the update histories of the information that the migration path table has. The word "Yes" means that the user can refer to the history table, and "No" means that the user cannot refer to the history table.

The word "operation" represents whether the user can operate and update the migration path table (e.g., whether the user can add, delete and change the information). The word "Yes" means that the user can operate the table, and "No" means that the user cannot operate the table.

The authority table 779 clearly shows what kind of actions can/cannot be performed with a certain type of authority. According to this table 779, the extent that the configurations of the migration paths can be changed, and the extent of the reference information are restricted. The users can search for the information only within the scopes of the authorities given to the users.

Figure 12:
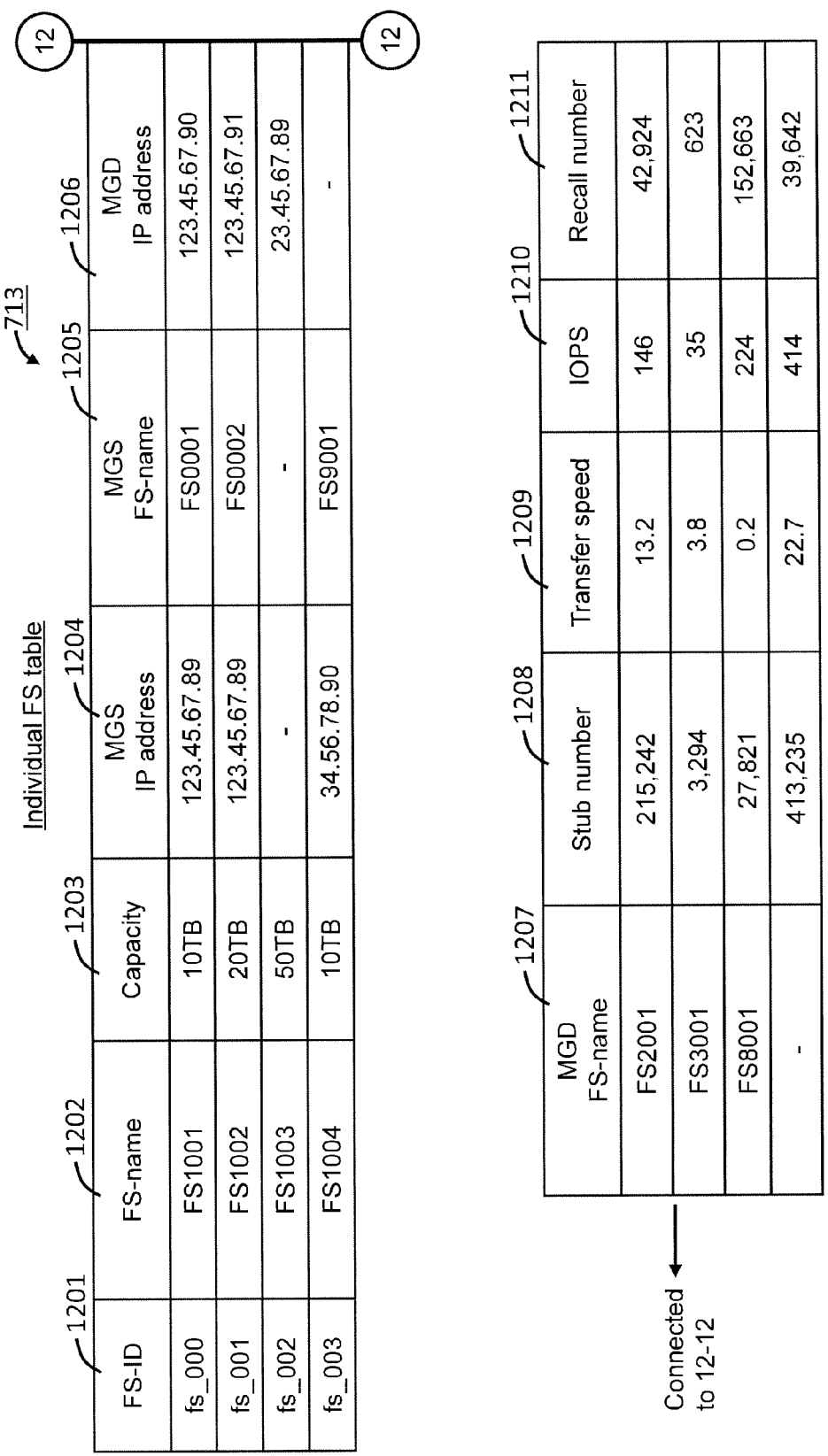
FIG. 12 shows a configuration example of an individual file system table 713.

FIG. 12 shows a configuration example of the individual file system table 713. In the following description, the term "migration source" is abbreviated to "MGS" and the term "migration destination" to "MGD."

The individual file system table 713 has the following information for each of the file systems 103 of the file storages 101 having this table 713:

Identification information (F-ID) 1201 of each file system 103;

Information (FS-name) 1202 indicating the name of the file system 103;

Information (capacity) 1203 indicating the capacity of the file system 103;

Information (MGS IP address) 1204 indicating the IP address of the file storage 101 that has a migration source file system 103 corresponding to the file system 103;

Information (MGS FS-name) 1205 indicating the name of the migration source file system 103 corresponding to the file system 103;

Information (MGD IP address) 1206 indicating the IP address of the file storage 101 that has a migration destination file system 103 corresponding to the file system 103;

Information (MGS FS-name) 1207 indicating the name of the migration destination file system 103 corresponding to the file system 103;

Information (stub number) 1208 indicating the number of stubs (stub files) of the file system 103;

Information (transfer speed) 1209 indicating the transfer speed of the file system 103 (the amount of data input/output to/from the file system 103 per unit time);

Information (IOPS) 1210 indicating the number of I/O commands that are input/output to/from the file system 103 per unit time (e.g., in one second); and Information (recall number) 1211 indicating a total number of files recalled to the file system 103.

The file system 103 that corresponds to a row in which the information on the migration source (the MGS IP address 1204 and the MGS FS-name 1205) are not recorded represents the front end node of the migration path (the file system 103 to which a file is written directly from one of the clients 201).

The file system 103 that corresponds to a row in which the information on the migration destination (MGD IP address 1206 and the MGD FS-name 1207) are not recorded represents the terminal end node of the migration path.

The file system 103 that corresponds to a row in which both the information on the migration source and the information on the migration destination are recorded represents the intermediate node of the migration path.

The file storage 101 can have a history table showing change histories of at least one type of information out of the information 1201 to 1211. The configuration of this history table can be the same as those of the history tables 811, 911, 913 and 1011 shown in FIGS. 8 to 10. In other words, this history table may include the update dates/times of history IDs and updated information.

FIG. 13 shows a configuration example of the file table 773.

The file table 773 has the following information for each of the files stored in the file system of the file storage 101 having this table 773:

File identification information (file ID) 1301;

Information (FS-name) 1302 indicating the name of the file system 103 having the files;

Information (capacity) 1303 indicating the capacity (size) of each file;

Information (MGS IP address) 1304 indicating the IP address of the file storage 101 having the migration source file system 103 of the file;

Information (MGS FS-name) 1305 indicating the name of the migration source file system 103 of the file;

Information (MGS IP address) 1306 indicating the IP address of the file storage 101 having the migration destination file system 103 of the file;

Information (MGS FS-name) 1307 indicating the name of the migration destination file system 103 of the file;

Information (stubbed date/time) 1308 indicating date/time at which the file is stubbed; and Information (recalled date/time) 1309 indicating the date/time for the latest recall of the file (stubbed file).

The file that corresponds to a row in which the information on the migration source (MGS IP address 1304 and the MGS FS-name 1305) are not recorded represents a file stored in the front end node of the migration path (the file system 103 to which the file is written directly from the client 201).

The file that corresponds to a row in which the information on the migration destination (MGD IP address 1306 and the MGD FS-name 1307) are not recorded represents a file stored in the terminal end node of the migration path. Even if the file system ("target file system" in this paragraph) 103 in which the file ("target file" in this paragraph) is stored is not the migration destination file system 103, the information on the migration destination is recorded in a row corresponding to the target file (substance) when the migration destination file system 103 exists in relation to the target file system 103 in the migration path that includes the target file system 103.

The stubbed file represents a file that corresponds to a row in which dates/times are recorded as the stubbed date/time 1308.

When a file corresponding to the stubbed file ("target stubbed file" in this paragraph) is recalled and the stubbed date/time 1308 corresponding to the target stubbed file (effective dates/times (not "-")) is recorded in a row corresponding to the stubbed file, the stubbed date/time 1308 is deleted (ineffective value "-" is obtained), and the date/time for the recall is recorded as the recalled date/time 1309 in the row corresponding to the target stubbed file. In other words, as a result of the recall, a file (substance), in place of the target stubbed file, is stored in the file system in which the target stubbed file was stored previously.

The file storage 101 can have a history table showing change histories of at least one type of information out of the information 1301 to 1309. The configuration of this history table can be the same as the history table for at least one type of the information out of the information 1201 to 1211 shown in FIG. 12.

FIG. 14 shows an example of a relation between the devices and the tables.

The management computer 105 has the management storage table 771, the migration path table 775, the management file system table 773, the user table 777, and the authority table 779 (marked with ○), but does not have the file table 715 (marked with x). The management computer 105 acquires the information included in the file table 715 of the file storage 101.

The file storage 101 has information on the file storage 101 out of the plurality of file storages 101 (marked with Δ). Furthermore, the file storage 101 has the file system 103 of the file storage 101 and the information on the migration source and migration destination of the file system 103 in the migration path (see FIGS. 12 and 13) (marked with ▲). The file storage 101 further has the information on the file system that the file storage 101 has (see FIG. 12) (marked with Δ). The file storage 101 also has the information on the files that the file storage 101 has (see FIG. 13) (marked with ○). The file storage 101 has neither the user table 777 nor the authority table 779.

As shown in FIG. 14, the processes that are performed until a response is obtained vary depending on a searched subject.

In other words, when the searched subject is the information on the file storage, migration path, file system, user, or authority, the search program 755 may specify the information complying with the search condition, from one or more tables (including the history tables) of the management computer 105, and then output (e.g., display) the specified information.

When the searched subject is the information on a file, the search program 755 specifies, for example, the file storage 101 complying with the search condition, from one or more tables (history tables) of the management computer 105, and then transmits an information acquisition instruction to the specified file storage 101. The search program 755 may specify the information on the file complying with the search condition, from information acquired in response to the instruction, and then output (e.g., display) the specified information.

The processes performed in the present embodiment are described next.

Figure 15:
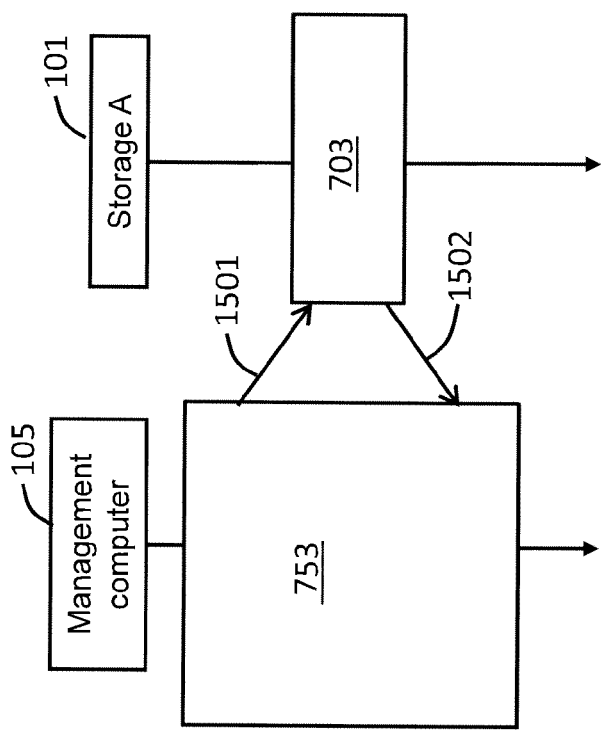
FIG. 15 shows an example of an information acquisition process flow.
Figure 16:
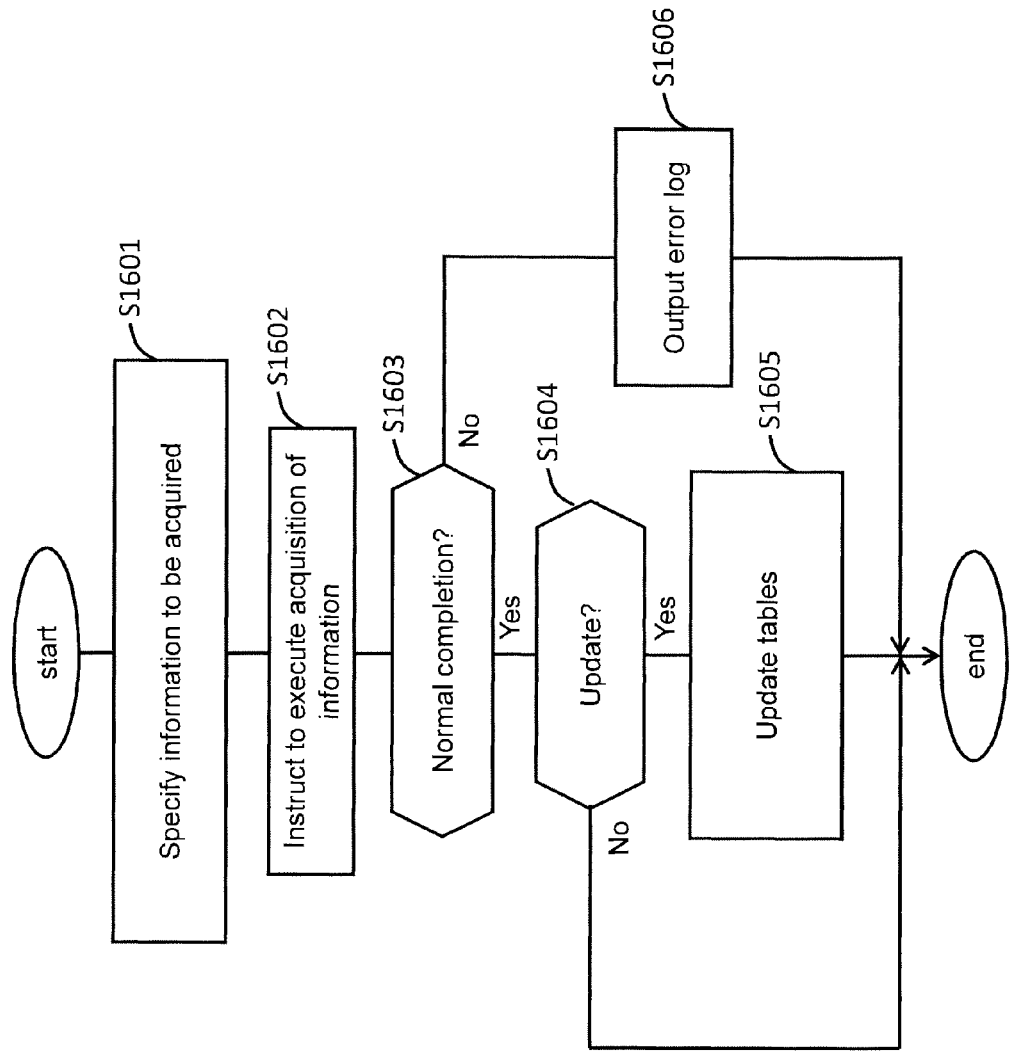
FIG. 16 shows an example of a flow of processes performed by an information acquisition program 753.
Figure 17:
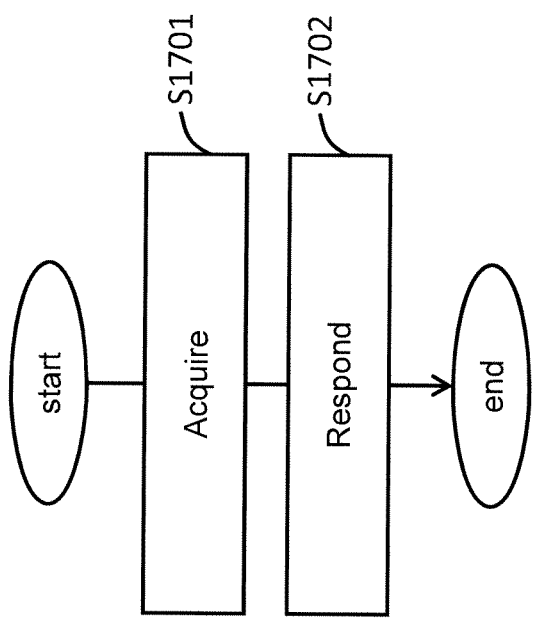
FIG. 17 shows an example of a flow of processes performed by an information acquisition response program 703.

FIG. 15 shows an example of an information acquisition process flow. FIGS. 15 to 17 adopt examples of acquiring information from the file storage A.

The management computer 105 (the information acquisition program 753) transmits an execution instruction (information acquisition instruction) to execute the information acquisition response program 703, to the file storage A, which is an information acquisition source (arrow 1501). The information acquisition response program 703 is executed in the file storage A that has received the execution instruction. In other words, the program 703 acquires, from one or more tables within the file storage A (including the history tables), information designated according to the execution instruction, and replies to the management computer 105 with the acquired information (arrow 1502).

FIG. 16 shows an example of a flow of processes performed by the information acquisition program 753.

In step S1601, the information acquisition program 753 specifies information to be acquired. The specified information may be information designated by the user (administrator) of the management computer 105 or predetermined type of information. For example, the information to be specified may be information in a large unit such as the individual file system table 713 or information in a small unit such as the information recorded in a specific row of the individual file system table 713.

In step S1602, the program 753 transmits an execution instruction to execute the information acquisition response program 703, to the file storage A. This execution instruction includes the information for identifying the information specified in step S1601.

In step S1603, the program 753 determines whether the response to the execution instruction transmitted in step S1602 indicates normal completion or not.

When the result of the determination made in step S1603 is negative (S1603: No), the program 753 outputs (e.g., displays) an error log in step S1606.

When the result of the determination made in step S1603 is positive (S1603: Yes), the program 753 determines, in step S1604, whether the information is updated or not. For example, the program 753 compares the information received as the response, with the information corresponding to the former information and recorded in the table, and determines whether these information are different from each other.

When the result of the determination made in step S1604 is positive (S1604: Yes), the program 753 registers the acquired information to the table and, when there is a history table for this information, adds the acquired information to the history table in step S1605. For example, when the updated information has the capacity of the file system A of the file storage A, the program 753 updates the capacity 904 corresponding to the file system A and adds the information same as the latest capacity 904 and the updated date/time to the history table corresponding to the capacity 904.

FIG. 17 shows an example of a flow of processes performed by the information acquisition response program 703.

In step S1701, the information acquisition response program 703 receives the execution instruction from the information acquisition program 753 (the management computer 105), and acquires information that is designated according to the execution instruction, from one or more tables (including the history tables).

In step S1702, the program 703 replies to the program 753 (management computer 105) with the acquired information.

Figure 18:
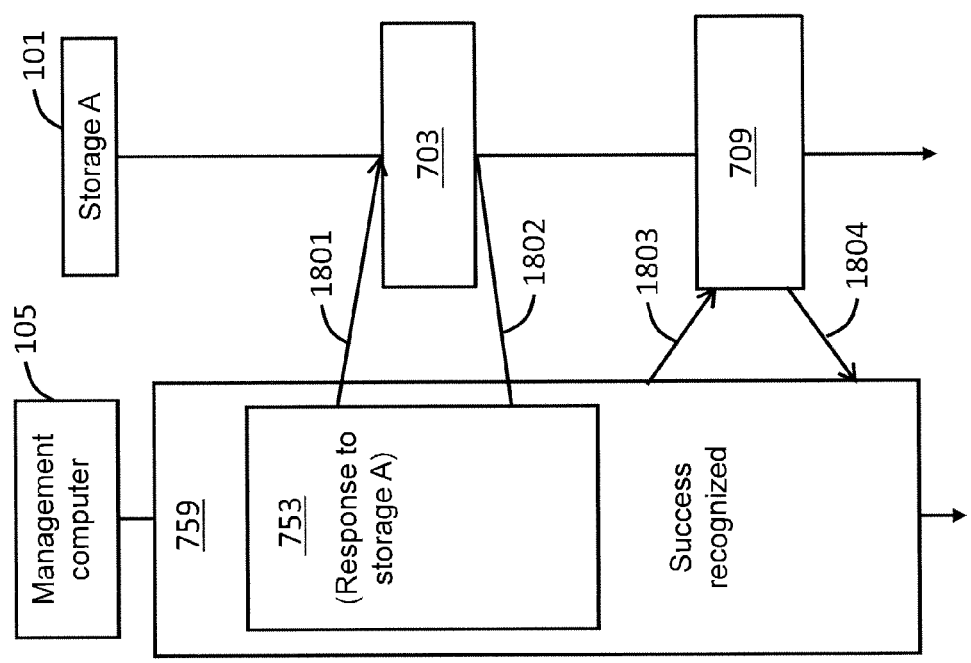
FIG. 18 shows an example of a flow of adding a migration path.

FIG. 18 shows an example of a flow of adding a migration path. FIGS. 18 to 21 adopt examples of adding the file system B of the file storage B as the terminal end node of the migration path when the only node of the migration path is the file system A of the file storage A.

In the management computer 105, the path addition instruction program 759 calls out the information acquisition program 753. The program 753 transmits an execution instruction (information acquisition instruction) to execute the information acquisition response program 703, to the file storage A that has the file system A, which is the terminal end node before the file system B is added as the terminal end node (arrow 1801). The information acquisition response program 703 is executed in the file storage A that has received the execution instruction. In other words, the program 703 acquires, from one or more tables within the file storage A (including the history tables), information designated according to the execution instruction, and replies to the management computer 105 with the acquired information (arrow 1802).

When, in the management computer 105, the path addition instruction program 759 recognizes that the response is successfully received, the path addition instruction program 759 transmits an execution instruction to execute the path addition program 709 within the file storage A (arrow 1803). The path addition program 709 executes a process in accordance with this execution instruction and replies to the path addition instruction program 759 with a result of the process (arrow 1804).

Figure 19:
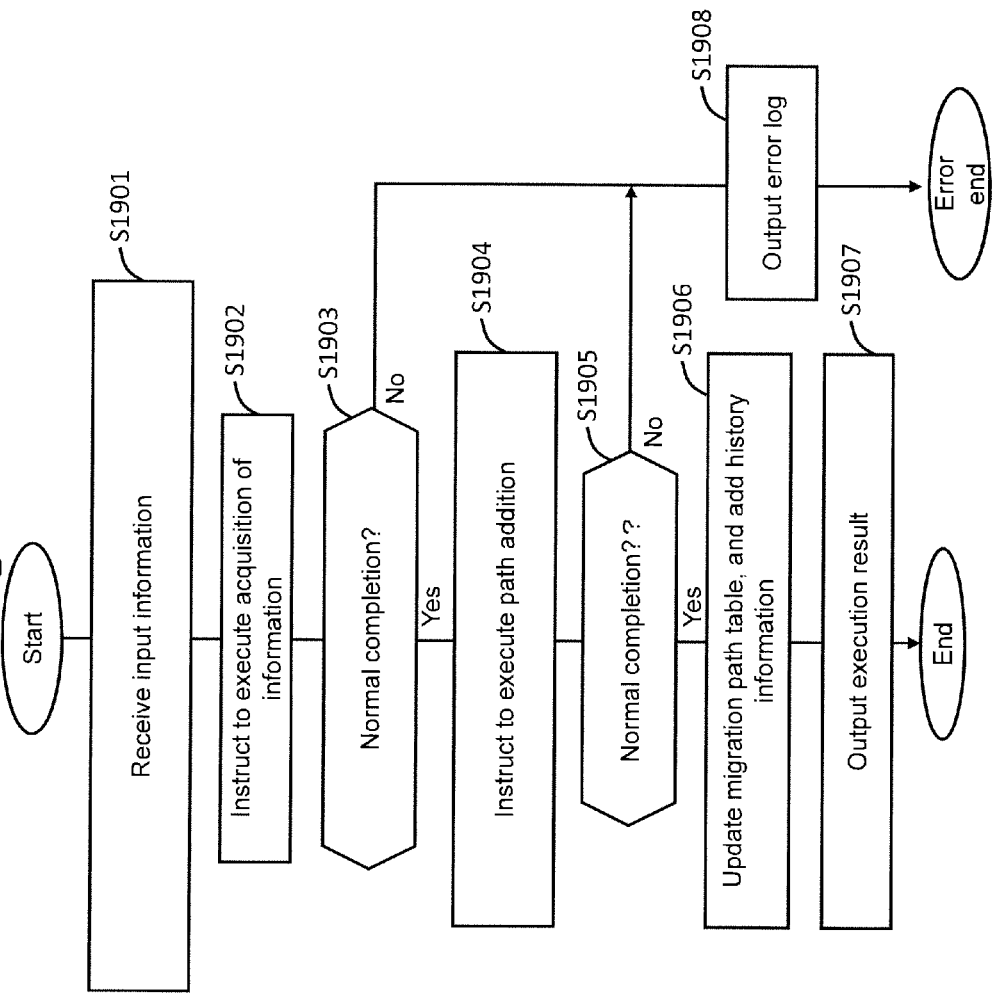
FIG. 19 shows an example of a flow of processes performed by a path addition instruction program 759.

FIG. 19 shows an example of a flow of processes performed by the path addition instruction program 759.

In step S1901, the path addition instruction program 759 receives, from the input device 657, input information that includes the following information elements:

The migration path ID (MP-ID);
The name of the file system B to be added (FS-name); and
The IP address of the file storage B that has the file system B to be added.

In step S1902, the program 759 transmits an execution instruction to execute the information acquisition response program 703, to the migration source file storage A by calling out the information acquisition program 753.

In step S1903, the program 759 determines whether the response from the migration source file storage A indicates normal completion or not.

When the result of the determination made in step S1903 is positive (S1903: Yes), the program 759, in step S1904, transmits an execution instruction to execute the path addition program 709, to the file storage A that has the file system A, which is the terminal end node before the file system B is added as the terminal end node.

In step S1905, the program 759 determines whether the response from the file storage A indicates normal completion or not.

When the result of the determination made in step S1905 is positive (S1905: Yes), the program 759, in step S1906, updates the migration path table 775 and adds the history information to the history table. More specifically, for example, the program 759 performs the following processes:

Recording the FS-name ($2^{nd}$ FS 1003-2) of the file system B, which is added as the terminal end node of the migration path, in a row that includes the MP-ID 1001 complying with the MP-ID that is input in step S1901; and Adding, as the history information, the FS-names of both of the file systems A and B (i.e., file system A→file system B) and the updated date/time to the history table that corresponds to the MP-ID 1001 complying with the MP-ID that is input in step S1901.

In step S1907, the program 759 outputs the result of the execution of the process (e.g., normal completion indicated by the response received from the path addition program 709).

When the result of the determination made in step S1903 or step S1905 is negative (S1903: No, or S1905: No), the program 759 outputs an error log (e.g., an error log from the path addition program 709) in step S1908.

Figure 20:
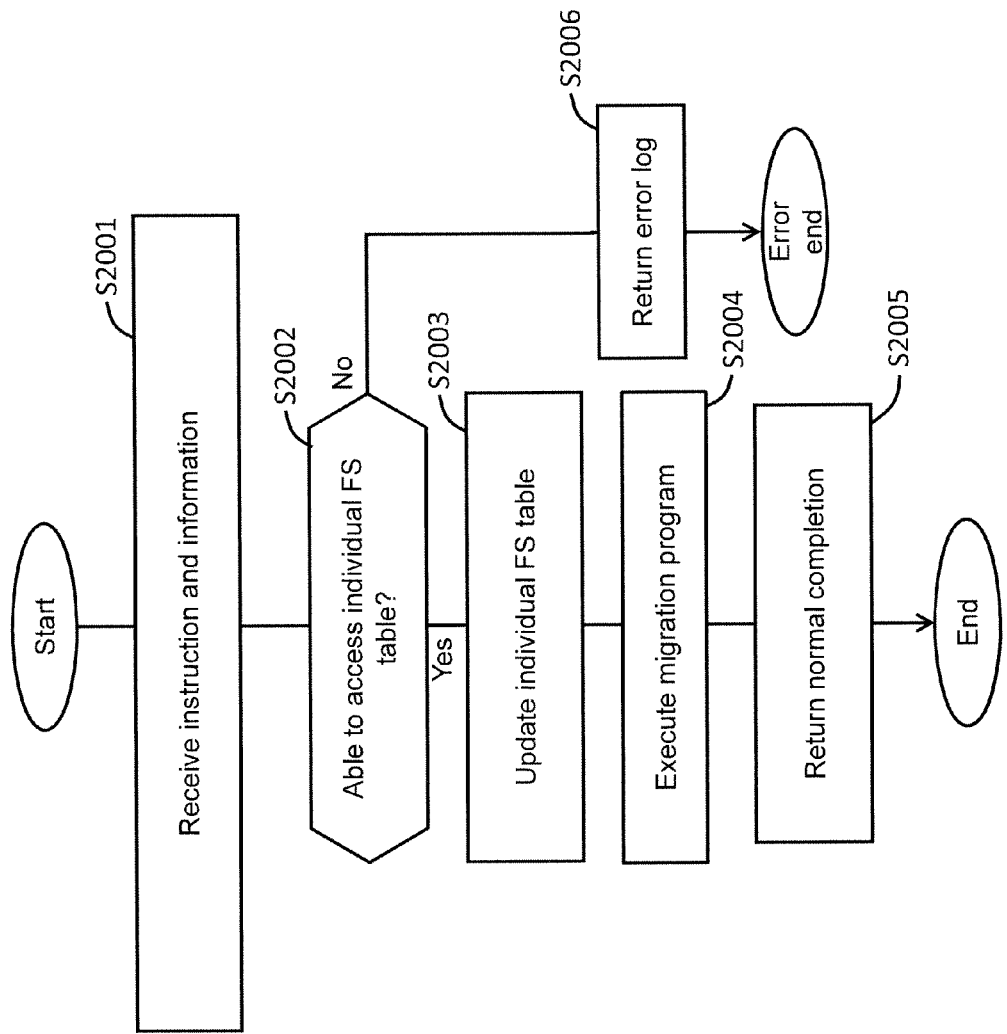
FIG. 20 shows an example of a flow of processes performed by a path addition program 709.

FIG. 20 shows an example of a flow of processes performed by the path addition program 709.

In step S2001, the path addition program 709 receives the execution instruction that is transmitted in step S1904 shown in FIG. 19. The execution instruction includes, for example, the following information:

(20-1) The name of the migration source file system A (FS-name);
(20-2) The name of the file system B to be added (FS-name); and
(20-3) The IP address of the file storage B that has the file system B to be added.

In step S2002, the program 709 determines whether the migration destination file system B can be accessed or not. More specifically, the program 709 determines, for example, based on the IP address of the file storage B, whether communication with the file storage B can be established or not.

When the result of the determination made in step S2002 is negative (S2002: No), the program 709 replies to the management computer 105 (the path addition instruction program 759) with an error log in step S2006.

When the result of the determination made in step S2002 is positive (S2002: Yes), the program 709 updates the individual file system table 713 in step S2003. More specifically, for example, the program 709 records, as the MGD IP address 1206 and the MGD FS-name 1207, the above-described (20-2) and (20-3) into a row that includes the MGS FS-name 1205 matching the abovementioned (20-1). In addition, the program 709, for example, may add the above-described (20-2) ((20-3)) to the history table corresponding to the MGD IP address 1206 (MGD FS-name 1207) in terms of the row that includes the NGS FS-name 1205 matching the abovementioned (20-1).

In step S2004, the program 709 executes the migration program 701. Note that the migration program 701 may be executed after the addition of a migration path, upon occurrence of a predetermined event, or after a lapse of a certain period of time.

In step S2005, the program 709 replies to the management computer 105 (the path addition instruction program 759) with normal completion.

Figure 21:
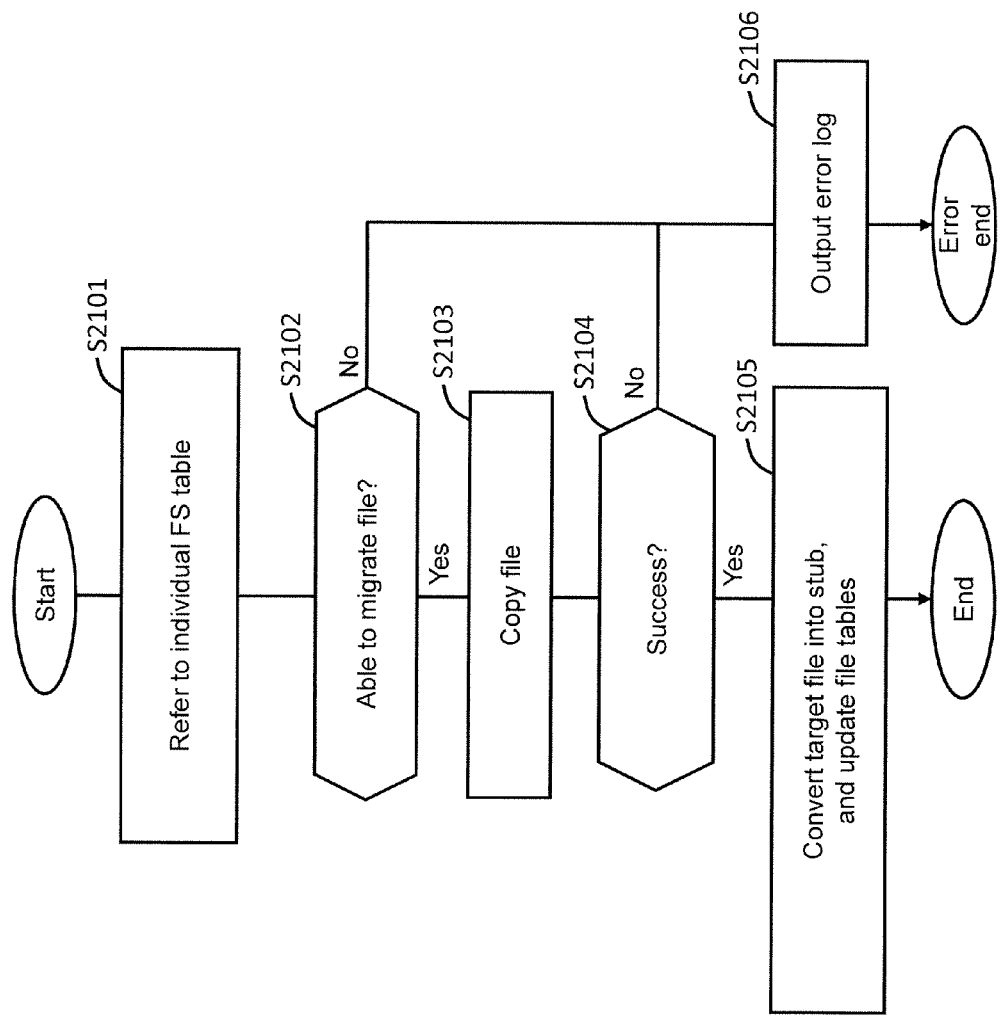
FIG. 21 shows an example of a flow of processes performed by a migration program 701.

FIG. 21 shows an example of a flow of processes performed by the migration program 701.

In step S2101, the migration program 701 specifies the MGD IP address 1206 and the MGD FS-name 1207 corresponding to the migration source file system A (the node proximal to the terminal end node obtained after the addition of a migration path). As a result, the file system B is specified as the migration destination.

In step S2102, the program 701 determines whether a file within the file system A can be migrated to the migration destination file system B. Specifically, for example, the program 701 determines, based on the IP address of the file storage B, whether communication with the file storage B can be established or not.

When the result of the determination made in step S2102 is positive (S2102: Yes), the program 701 copies a file (substance) of the file system A to the file system B, in step S2103. All of the files within the file system A may be copied, or only a file among the files that complies with a predetermined condition may be copied (e.g., only a file that has an access frequency of less than a predetermined value).

In step S2104, the program 701 determines whether the copying is done successfully.

When the result of the determination made in step S2104 is positive (S2104: Yes), the program 701 performs the following processes in step S2105:

Converting the copied file (the file within the file system A) into a stub;

Updating the stubbed date/time 1308 corresponding to the copied file to information indicating the date/time at which the copied file is converted into a stub; and Adding history information indicating the updated stubbed date/time 1308 to the history table corresponding to the stubbed date/time 1308.

When the result of the determination made in step S2102 or step S2104 is negative (S2102: No, or S2104: No), the program 701 outputs an error log in step S2106. In this case, in step S2005 shown in FIG. 20, for example, the program 701 may reply to the management computer 105 with abnormal completion in place of normal completion.

As the MGD IP address 1306 and the MGD FS-name 1307 corresponding to all of the files (or the copied file) within the file system A, same information as the MGD IP address 1206 and the MGD FS-name 1207 corresponding to the file system A may be recorded in the file table 715 of the file storage A. These information may be recorded at any time (e.g., in step S2003 shown in FIG. 20 or in step S2105 shown in FIG. 21).

Figure 22:
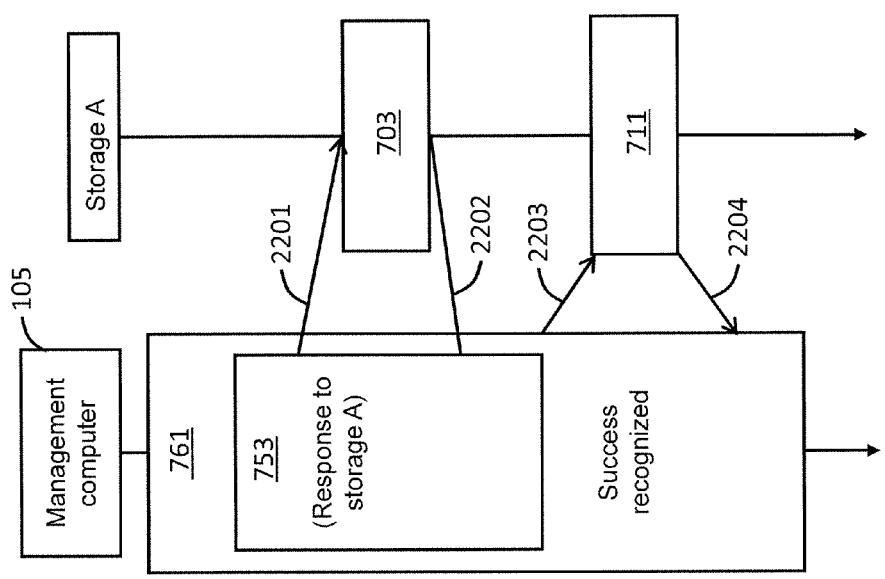
FIG. 22 shows an example of a flow of deletion of a migration path.

FIG. 22 shows an example of a flow of deletion of a migration path. FIGS. 22 to 25 adopt examples in which the terminal end node of the migration path is the file system B of the file storage B and the migration source corresponding to the file system B is the file system B of the file storage A.

The path deletion instruction program 761 calls out the information acquisition program 753 in the management computer 105. The program 753 transmits an execution instruction (information acquisition instruction) to execute the information acquisition response program 703, to the file storage A that has the file system A, which is the migration source corresponding to the file system B to be deleted (arrow 2201). The information acquisition response program 703 is executed in the file storage A that has received the execution instruction. In other words, the program 703 acquires, from one or more tables within the file storage A (including the history tables), information designated according to the execution instruction, and replies to the management computer 105 with the acquired information (arrow 2202).

When, in the management computer 105, the path deletion instruction program 761 recognizes that the response is successfully received, the path deletion instruction program 761 transmits an execution instruction to execute the path deletion program 711 within the file storage A (arrow 2203). The path deletion program 761 executes a process in accordance with this execution instruction, and replies to the path deletion instruction program 761 with a result of the process (arrow 2204).

Figure 23:
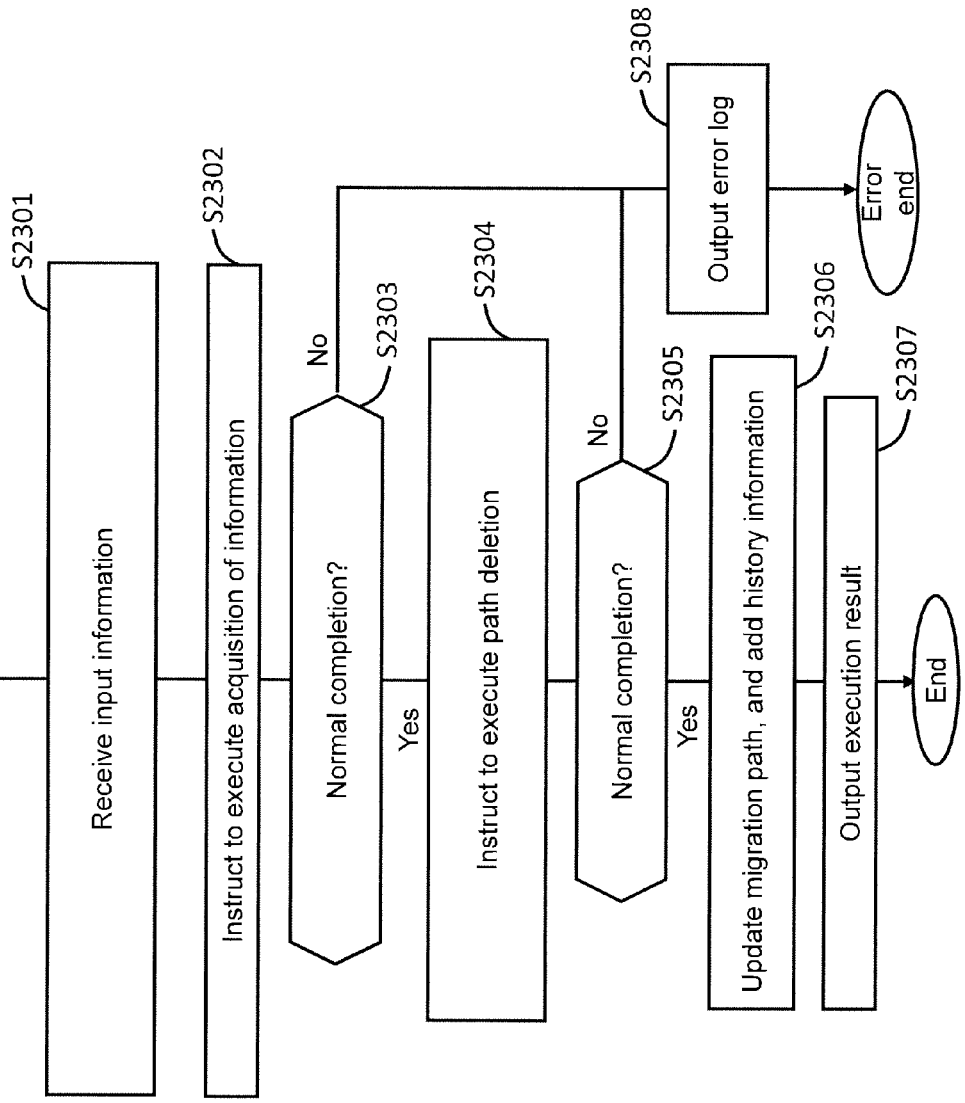
FIG. 23 shows an example of a flow of processes performed by a path deletion instruction program 761.

FIG. 23 shows an example of a flow of processes performed by the path deletion instruction program 761.

In step S2301, the path deletion instruction program 761 receives, from the input device 657, input information that includes the following information elements:

The migration path ID (MP-ID);
Information indicating whether a recall is executed or not;
The name of the file system B to be deleted (FS-name); and
The IP address of the file storage B that has the file system B to be deleted.

Note that the a recall of a file from the file system B to be deleted to the migration source file system A may certainly be performed, in which case the information indicating whether a recall is executed or not is not required.

In step S2302, the program 761 transmits an execution instruction to execute the information acquisition response program 703, to a recall destination file storage A by calling out the information acquisition program 753.

In step S2303, the program 761 determines whether the response from the recall destination file storage A indicates normal completion or not.

When the result of the determination made in step S2303 is positive (S2303: Yes), the program 761, in step S2304, transmits an execution instruction to execute the path deletion program 711, to the file storage A that has the file system A, which becomes a new terminal end node after deletion of the file system B.

In step S2305, the program 761 determines whether the response from the file storage A indicates normal completion or not.

When the result of the determination made in step S2305 is positive (S2305: Yes), the program 761, in step S2306, updates the migration path table 775 and adds the history information to the history table. More specifically, for example, the program 761 performs the following processes:

Deleting the FS-name of the file system B from the row that includes the MP-ID 1001 complying with the MP-ID that is input in step S2301; and Adding, as the history information, the FS-names of the file system A only (i.e., the only node of the migration path is the file system A) and the updated date/time to the history table corresponding to the MP-ID 1001 complying with the MP-ID that is input in step S2301.

In step S2307, the program 761 outputs the result of the execution of the process (e.g., normal completion indicated by the response received from the path deletion program 711).

When the result of the determination made in step S2303 or step S2305 is negative (S2303: No, or S2305: No), the program 761 outputs an error log (e.g., an error log from the path deletion program 711) in step S2308.

Figure 24:
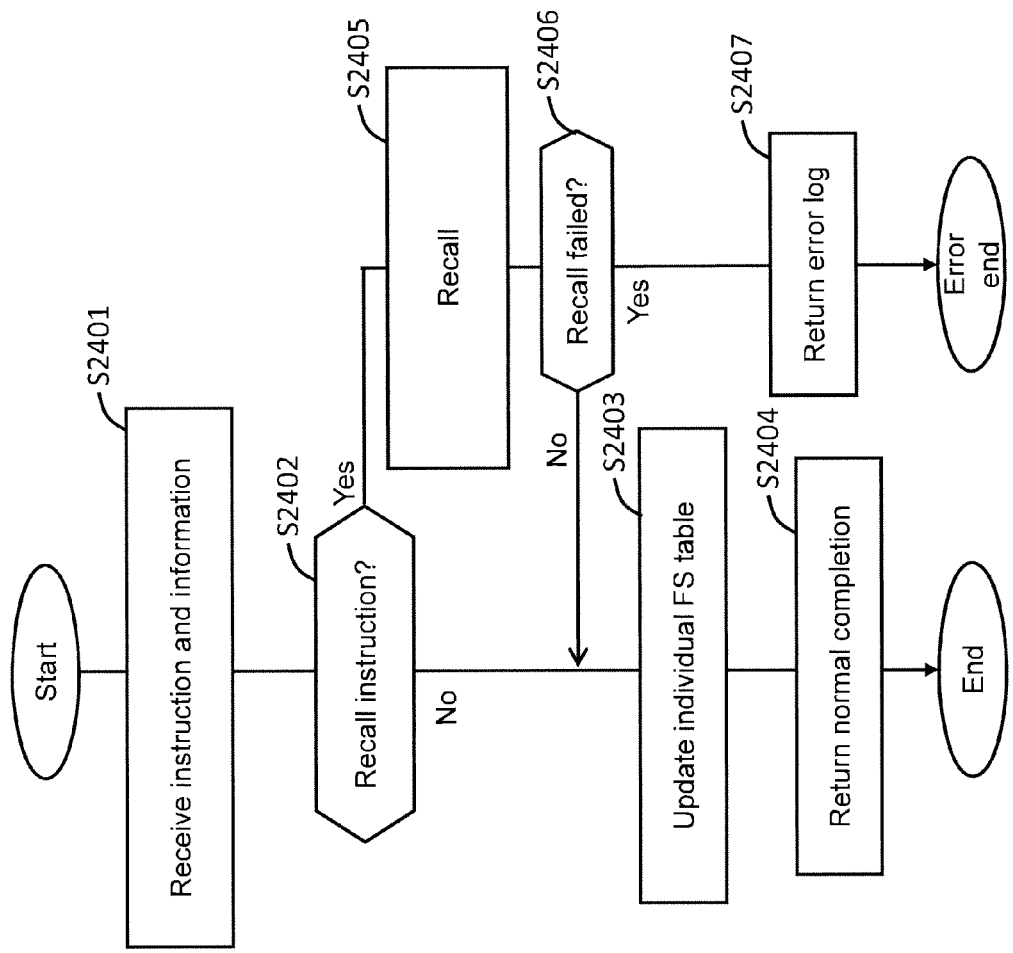
FIG. 24 shows an example of a flow of processes performed by a path deletion program 711.

FIG. 24 shows an example of a flow of processes performed by the path deletion program 711.

In step S2401, the path deletion program 711 receives the execution instruction that is transmitted in step S2304 shown in FIG. 23. The execution instruction includes, for example, the following information:

(24-1) The name of the recall destination file system A (FS-name);
(24-2) The name of the file system B to be added (FS-name);
(24-3) The IP address of the file storage B that has the file system B to be added; and
(24-4) Information indicating whether a recall is executed or not.

In step S2402, the program 711 determines whether the abovementioned (24-4) indicates that a recall is executed.

When the result of the determination made in step S2402 is negative (S2402: No), the program 711 updates the individual file system table 713 in step S2403. Specifically, for example, the program 711 deletes the MGD IP address 1206 and the MGD FS-name 1207 that match the abovementioned (24-2) and (24-3), from the row that includes the MGS FS-name 1205 matching the above-mentioned (24-1). For instance, the program 711 may add information indicating that the abovementioned (24-2) ((24-3)) is deleted, to the history table corresponding to the MGD IP address 1206 (the MGD FS-name 1207), in terms of the row that contains the MGS FS-name 1205 matching the abovementioned (24-1).

In step S2404, the program 711 replies to the management computer 105 (the path deletion instruction program 761) with normal completion.

When the result determined in step S2402 is positive (S2402: Yes), the program 711 executes the recall program 705 in step S2405.

In step S2406, the program 711 determines whether the recall has failed or not.

When the result of the determination made in step S2406 is negative (S2406: No), step S2403 is executed.

When the result of the determination made in step S2406 is positive (S2406: Yes), the program 711 replies to the management computer 105 (the path deletion instruction program 761) with an error log.

Figure 25:
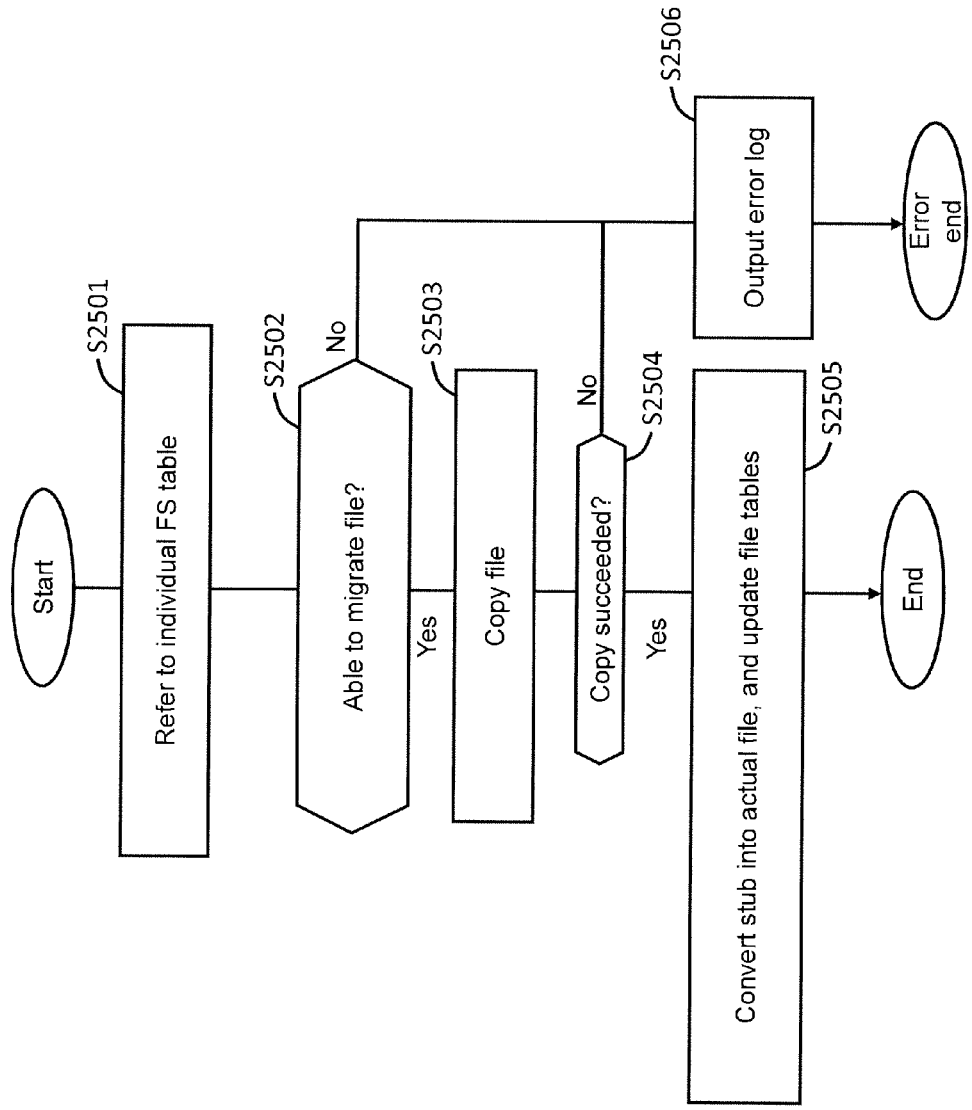
FIG. 25 shows an example of a flow of processes performed by a recall program 705.

FIG. 25 shows an example of a flow of processes performed by the recall program 705.

In step S2501, the recall program 705 specifies, from the individual file system table 713, the MGD IP address 1206 and the MGD FS-name 1207 that comply with the IP address and FS-name of a recall source file system B (the terminal end node of the migration path).

In step S2502, the program 705 determines whether a file can be migrated (recalled) from the file system B to the file system A. Specifically, for example, the program 705 determines, based on the IP address of the file storage B, whether communication with the file storage B can be established or not.

When the result of the determination made in step S2502 is positive (S2502: Yes), the program 705, in step S2503, copies the file to the file system A, the file being a link of a stub of the file system A (a file within the file system B). Specifically, the program 705 performs, for example, the following processes:
(S2503-1) Specifying a stub of the file system A (e.g., specifying, from the file table 715, a row that includes the MGD IP address 1305 and MGD FS-name 1306 matching the MAG IP address 1206 and MGD FS-name 1207 that are specified in step S2501, the row having the stubbed date/time 1308 recorded therein); and
(S2503-2) Reading the file that serves as a link of the stub corresponding to the specified row.

Hereinafter, the stub corresponding to the specified row (the stub for the recall destination file system A) is referred to as "target stub" in the description of FIG. 25.

In step S2504, the program 705 determines whether the copying is done successfully.

When the result of the determination made in step S2504 is positive (S2504: Yes), the program 705 performs, for example, the following processes in step S2505:
(S2504-1) Converting the target stub based on the copied file (e.g., when the copied file is a substance, the target stub is deleted. When the copied file is a stub, the link represented by the target stub is updated to a link represented by the copied stub);
(S2504-2) When the file copied in S2504-1 is a substance, the stubbed date/time 1308 corresponding to the target stub is deleted. When the file copied in S2504-1 is a stub, the stubbed date/time 1308 corresponding to the target stub is updated to information indicating the date/time at which another stub is copied; and
(S2504-3) Adding the history information indicating the updated stubbed date/time 1308 to the history table that corresponds to the stubbed date/time 1308 corresponding to the target stub (e.g., the stubbed date/time 1308 obtained after deleting or updating the stubbed date/time 1308).

The recall program 705 is sometimes executed not only when the migration path is deleted but also when the migration path is changed. When the migration path is deleted, the link for the target stub is a substance, not a stub.

When the result of the determination made in step S2502 or step S2504 is negative (S2502: No, or S2504: No), the program 705 outputs an error log in step S2506.

Note that, when the migration path is deleted, the MGD IP address 1306 and MGD FS-name 1307 corresponding to the target stub may be deleted from the file table 715 of the file storage A.

Figure 26:
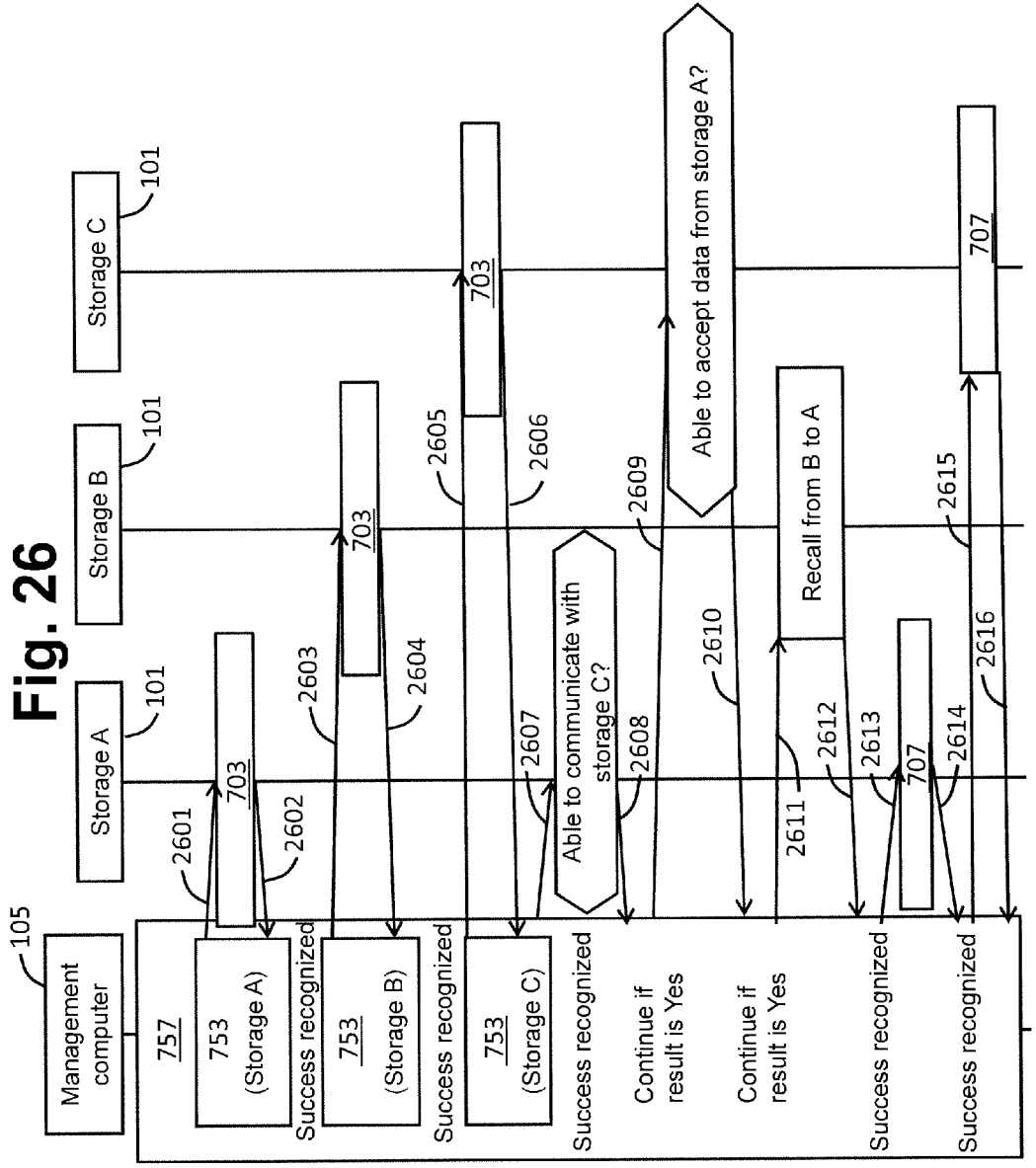
FIG. 26 shows an example of a migration path change process flow.

FIG. 26 shows an example of a migration path change process flow. FIGS. 26 to 29 adopt examples in which the file system B is deleted from the migration path of file system A→file system B→file system C.

The path change instruction program 757 calls out the information acquisition program 753 in the management computer 105. The program 753 transmits an execution instruction (an information acquisition instruction) to execute the information acquisition response program 703, to the file storage B that has the file system B to be deleted from the migration path, the file storage A that has the file system A serving as the migration source corresponding to the file system B, and the file storage C that has the file system C serving as the migration destination corresponding to the file system B (arrows 2601, 2603 and 2605). When it is recognized, based on the responses from these file storages (arrows 2602, 2604 and 2606), that the execution is performed successfully, the process is proceeded. Note that the execution instruction may be transmitted to the file storages A to C at once or sequentially. The transmission destination may be changed according to the flow of the migration path. For example, when the execution instruction is transmitted first to the file storage A (arrow 2601) and then it is recognized, based on the response therefrom (arrow 2602), that the execution is done successfully, the execution instruction is transmitted to the file storage B (arrow 2603). When it is recognized, based on the response therefrom (arrow 2604), that the execution is done successfully, the execution instruction is transmitted to the file storage C (arrow 2605). When it is recognized, based on the response therefrom (arrow 2606), that the execution is done successfully, the process may proceed.

When the process is proceeded, in the management computer 105, the path change instruction program 757 transmits an execution instruction to determine whether communication with the file storage C can be established or not, to the file storage A (arrow 2607). The file storage A determines whether the communication with the file storage C can be established or not, in response to the execution instruction, and then replies to the management computer 105 (the path change instruction program 757) with the result of the determination (arrow 2608). At this moment, the file storage C has the file system C that serves as the migration destination corresponding to the file system B to be deleted, and the file system B to be deleted is a migration destination corresponding to the file system A.

When the response from the file storage A expresses a positive determination result, the path change instruction program 757, in the management computer 105, transmits an execution instruction to determine whether the file can be received from the file storage A or not, to the file storage C (arrow 2609). In response to this execution instruction, the file storage C determines whether the file can be received from the file storage A or not (e.g., whether communication with the file storage A can be established or not), and replies to the management computing system 105 (the path change instruction program 757) with the result of the determination (arrow 2610). The execution instruction shown by the arrow 2609 may be transmitted prior to the execution instruction shown by the arrow 2607.

When the response from the file storage C (and the file storage A) expresses a positive determination result, the path change instruction program 757 transmits an execution instruction to recall the file from the file system B to the file system A, to the recall program 705 of the file storage B (arrow 2611), the file being a link of the stub related to the file system A.

When it is recognized, based on the response to the execution instruction on the recall (arrow 2612), that the execution is done successfully, the path change instruction program 757 transmits an execution instruction to execute the path change program 707, to the file storage A (arrow 2613). When it is recognized, based on the response to this execution instruction (arrow 2614), that the execution is done successfully, the path change instruction program 757 transmits the execution instruction to execute the path change program 707, to the file storage C (arrow 2615). When it is recognized, based on the response to this execution instruction (arrow 2616), that the execution is done successfully, the process is ended. The execution instruction to execute the path change program 707 may be transmitted to the file storages A and C at once.

Figure 28:
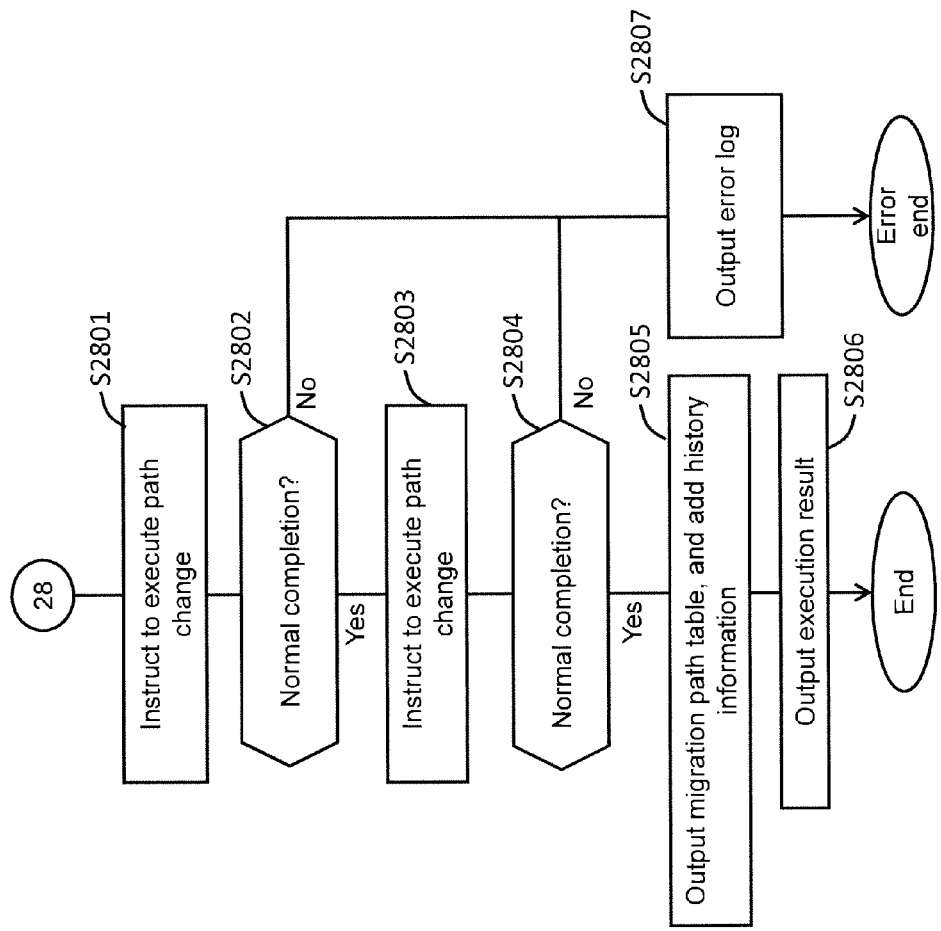
FIG. 28 shows the rest of the example of the flow of processes performed by the path change instruction program 757.

FIGS. 27A, 27B and 28 each show an example of a flow of processes performed by the path change instruction program 757.

In step S2701, the path change instruction program 757 receives, from the input device 657, input information that includes the following information elements:

(27-1) The migration path ID (MP-ID);
(27-2) Information indicating whether a recall is executed or not;
(27-3) The name of the file system B to be deleted (FS-name); and
(27-4) The IP address of the file storage B that has the file system B to be deleted.

Note that the a recall of a file from the file system B to be deleted to the migration source file system A may certainly be performed, in which case the information indicating whether a recalls is executed or not is not required.

Steps S2703 and S2704 ("loop K," hereinafter) are executed on all of search target storages. The term "search target storage" described in FIG. 27A indicates all of the file storages that have the migration source corresponding to the file system B to be deleted. Therefore, in the present embodiment, each of the search target storages represents the file storage A.

In step S2702, the program 757 transmits an execution instruction to execute the information acquisition response program 703, to the file storage A by calling out the information acquisition program 753.

In step S2703, the program 757 determines whether the response from the file storage A indicates normal completion or not.

When the result of the determination made in step S2703 is positive for all of the search target storages, the loop K is ended, and step S2707 shown in FIG. 27B is performed. When, on the other hand, the result of the determination made in step S2704 is negative for at least one of the search target storages (S2704: No), the program 757 outputs an error log in step S2706.

As shown in FIG. 27B, in step S2707 the program 757 transmits an execution instruction to determine whether communication with the file storage C can be established or not, to the file storage A. The file storage A, the transmission destination of this execution instruction, is the file storage 101 that has the file system A serving as the migration source corresponding to the file system B to be deleted.

In step S2708, the program 757 determines whether the response to the execution instruction transmitted in step S2707 indicates normal completion or not.

When the result of the determination made in step S2708 is positive (S2708: Yes), the program 757, in step S2709, transmits an execution instruction to determine whether a file can be received from the file storage A or not, to the file storage C. The file storage C, the transmission destination of this execution instruction, is the file storage 101 that has the file system C serving as the migration destination corresponding to the file system B to be deleted.

In step S2710, the program 757 determines whether the response to the execution instruction transmitted in step S2709 indicates normal completion or not.

When the result of the determination made in step S2710 is positive (S2710: Yes), the program 757 determines, in step S2711, whether the abovementioned (27-2) indicates the execution of a recall.

When the result of the determination made in step S2711 is positive (S2711: Yes), the program 757 executes, in step S2712, the recall program 705 within the file storage B.

In step S2713, the program 757 determines whether the recall has failed or not.

When the result of the determination made in step S2708 or step S2710 is negative (S2708: No, or S2710: No), or when the result of the determination made in step S2713 is positive (S2713: Yes), the program 757 outputs an error log.

When the result of the determination made in step S2713 or step S2711 is negative (S2713: No, or S2711: No), step S2801 shown in FIG. 28 is executed.

As shown in FIG. 28, in step S2801 the program 757 transmits an execution instruction to execute the path change program 707, to the file storage A that has the file system A serving as the migration source corresponding to the file system B to be deleted.

In step S2802, the program 757 determines whether the response from the file storage A indicates normal completion or not.

When the result of the determination made in step S2802 is positive (S2802: Yes), the program 757, in step S2803, transmits an execution instruction to execute the path change program 707, to the file storage C that has the file system C serving as the migration destination corresponding to the file system B to be deleted.

In step S2804, the program 757 determines whether the response from the file storage C indicates normal completion or not.

When the result of the determination made in step S2804 is positive (S2804: Yes), the program 757, in step S2805, updates the migration path table 775 and adds the history information to the history table. More specifically, for example, the program 757 performs the following processes:

Deleting the FS-name of the file system B from the row that includes the MP-ID 1001 complying with the MP-ID that is input in step S2701, and shifting the position of the FS-name of each file system (only the file system C in the present embodiment) following (on the downstream side of) the file system B, one step forward (toward the upstream side); and Adding, as the history information, information indicating the migration path (file system A→file system C) obtained after changing the configuration thereof, as well as the updated date/time, to the history table corresponding to the MP-ID 1001 complying with the MP-ID that is input in step S2701.

In step S2806, the program 757 outputs the result of the execution of the process (e.g., normal completion indicated by the response from the path change program 707).

When the result of the determination made in step S2802 or step S2804 is negative (S2802: No, or S2804: No), the program 757 outputs an error log (e.g., an error log from the path change program 707) in step S2807.

Figure 29:
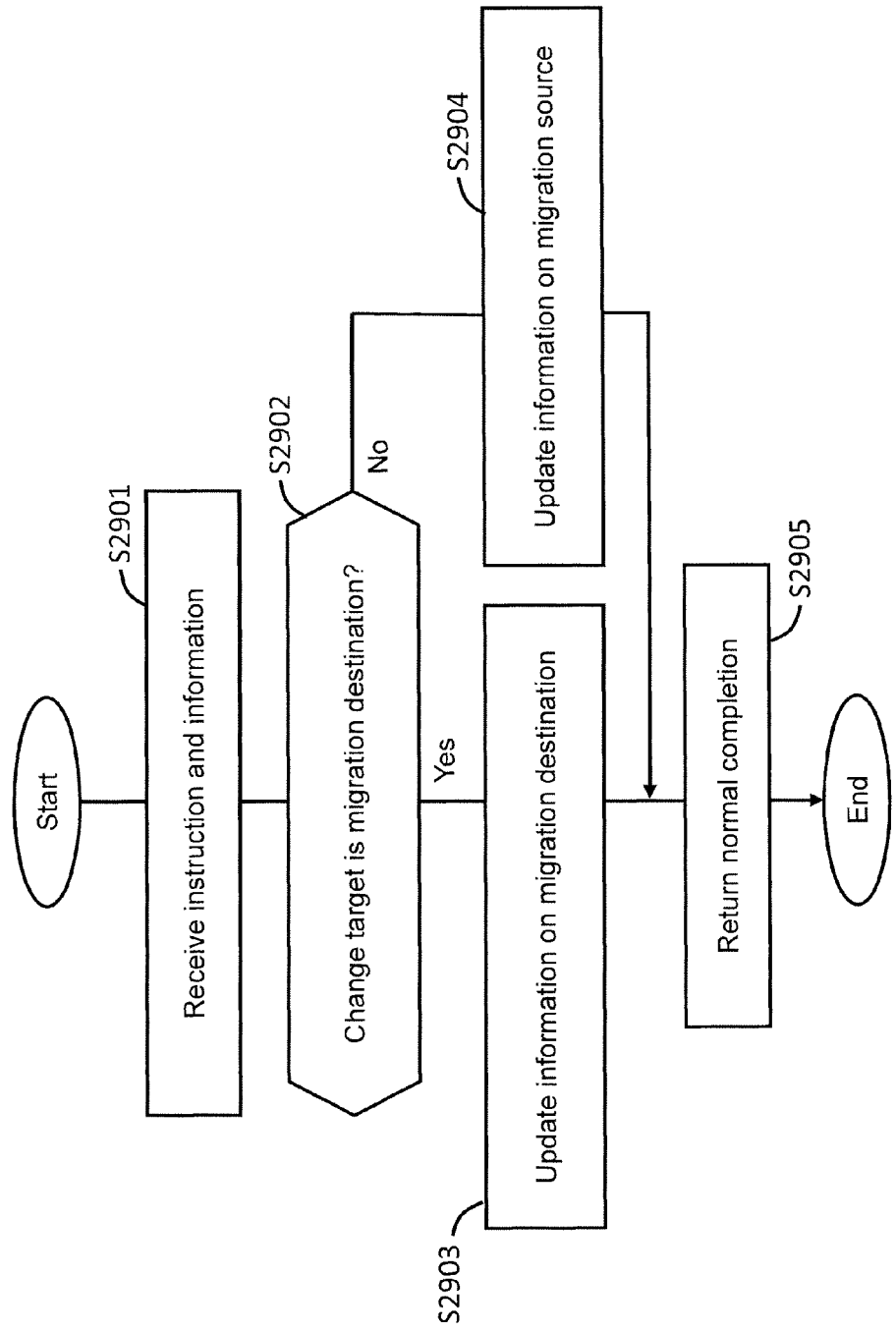
FIG. 29 shows an example of a flow of processes performed by a path change program 707.

FIG. 29 shows an example of a flow of processes performed by the path change program 707.

In step S2901, the path change program 707 receives an execution instruction transmitted in step S2801 or S2803 shown in FIG. 28. The execution instruction includes the following information:

(29-1) The name of the file system B to be deleted (FS-name);
(29-2) The name of the migration source or migration destination file system (the file system A or C) (FS-name);
(29-3) The IP address of the file storage (the file storage A or C) that has the migration source or migration destination file system; and
(29-4) Information indicating that the abovementioned (29-2) and (29-3) are either the migration source or the migration destination.

In step S2902, the program 707 determines whether the abovementioned (29-4) indicates the migration destination or not.

When the result of the determination made in step S2902 is positive (S2902: Yes), the program 707 changes the MGD FS-name 1207 matching the abovementioned (29-1) and the MGS IP address 1206 corresponding thereto in the individual file system table 713, to the abovementioned (29-2) and (29-3). According to this example, step S2902 changes the migration destination corresponding to the file storage A from the file system B to the file system C, in the file storage A.

When the result of the determination made in step S2902 is negative (S2902: No), the program 707 changes the MGS FS-name 1205 matching the abovementioned (29-1) and the MGS IP address 1204 corresponding thereto in the individual file system table 713, to the abovementioned (29-2) and (29-3). According to this example, step S2902 changes the migration source corresponding to the file storage C from the file system B to the file system A, in the file storage C.

In step S2905, the program 707 replies to the management computing system 105 (the path change instruction program 757) with normal completion.

Figure 30:
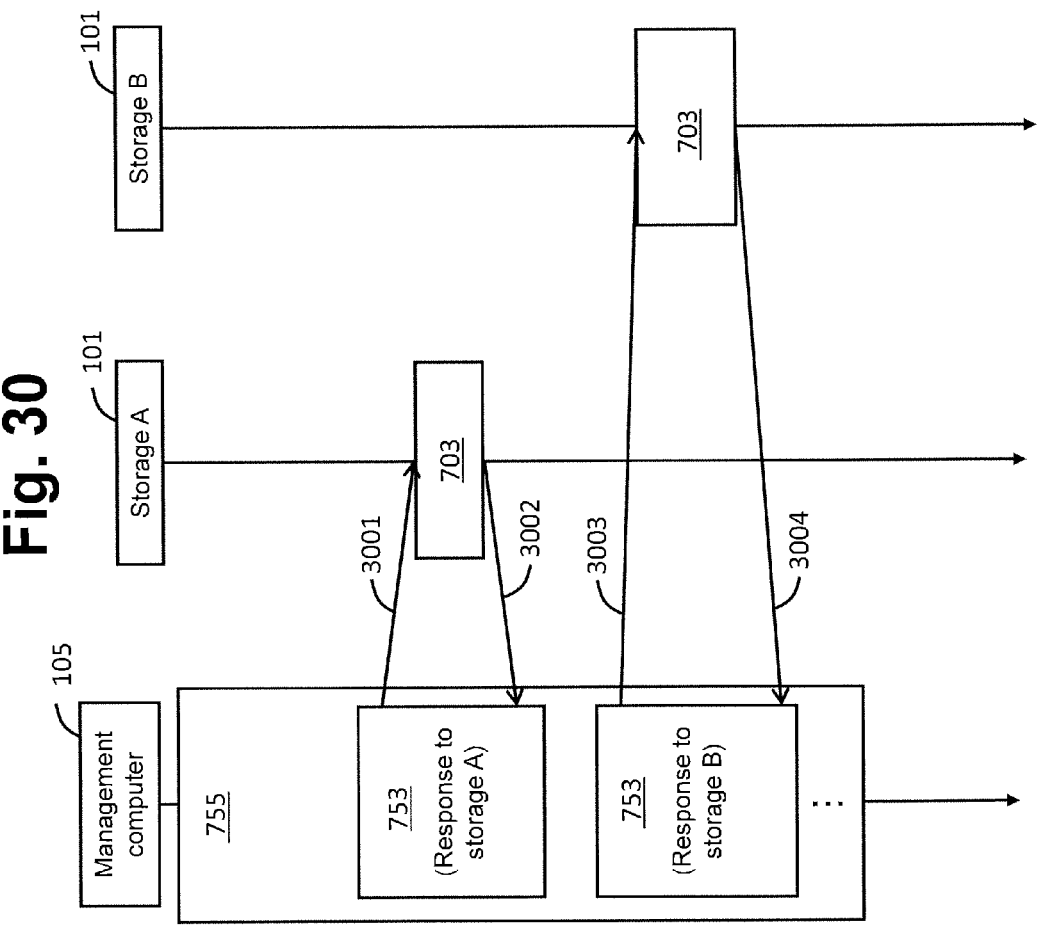
FIG. 30 shows an example of a search process flow.

FIG. 30 shows an example of a search process flow.

The search program 755 receives an input of a search condition, and searches for information corresponding to this search condition, from information acquired from one or more tables within the management computing system 105 (including the history tables) and/or one or more of the file storages 101 (e.g., the file storage(s) associated with the input search condition). In order to acquire the information from the file storages 101, the search program 755 calls out the information acquisition program 753, and the program 753 transmits an execution instruction to execute the information acquisition response program 703, to an information acquisition source file storage. According to the example shown in FIG. 30, the execution instruction is transmitted to the file storages A and B (arrows 3001 and 3003), and the information is returned from the file storages A and B (arrows 3002 and 3004).

Figure 31B:
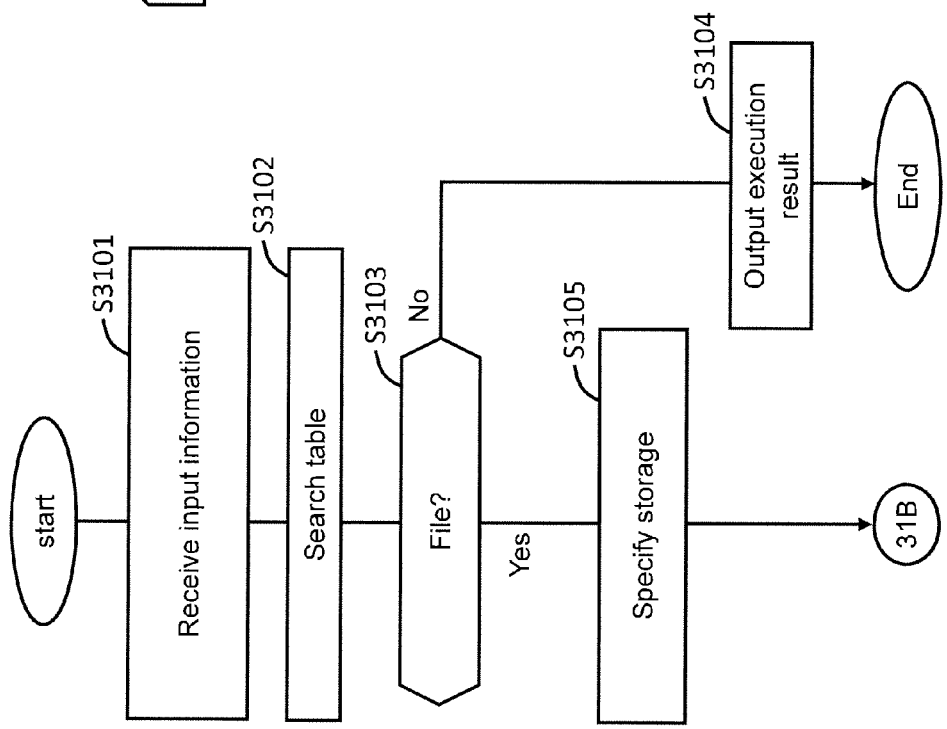
FIG. 31 shows an example of a flow of processes performed by a search program 755.
Figure 31A:
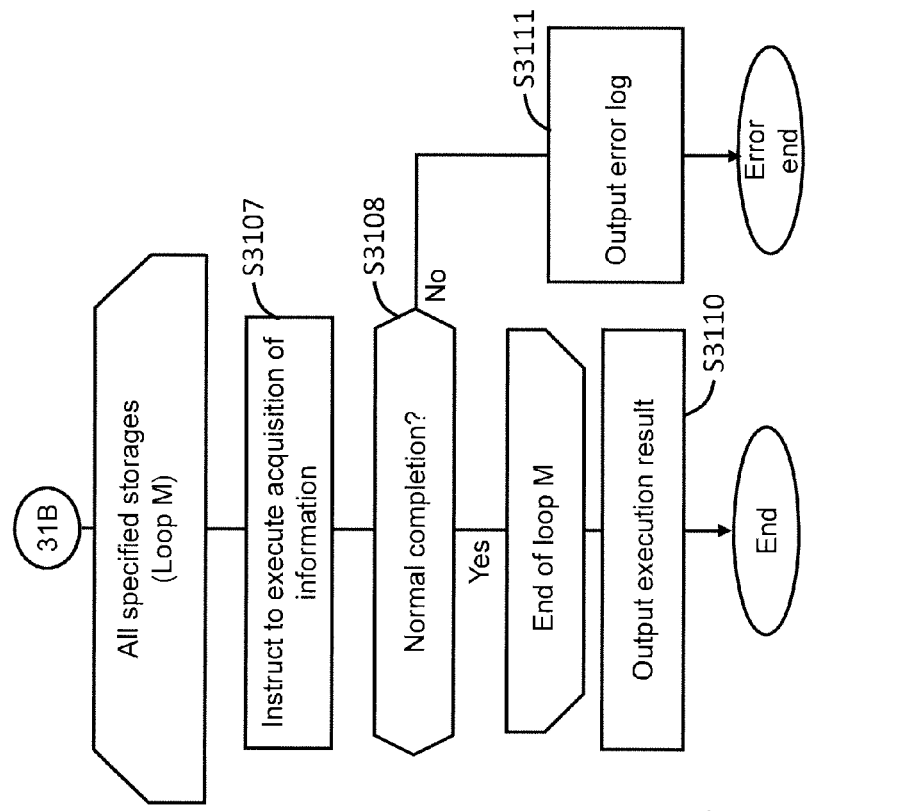

FIG. 31 shows an example of processes performed by the search program 755.

In step S3101, the search program 755 receives, from the input device 657, a search condition that includes the following information elements:

(31-1) A search target item; and
(31-2) A search target storage.

The search target storage may be a single file storage or two or more file storages within the file storage system. In addition, the search target storage may not be required.

In step S3102, the program 755 searches for information from one or more tables within the management computing system 105 (including the history tables), based on the search condition.

In step S3103, the program 755 determines whether the abovementioned (31-1) indicates a file.

When the result of the determination made in step S3103 is negative (S3103: No), the program 755 outputs (e.g., displays) the result of the execution (e.g., the information searched in step S3102) in step S3104.

When the result of the determination made in step S3103 is positive (S3103: Yes), the program 755, in step S3105, specifies the search target storage and the file storages associated therewith, and acquires information (e.g., the IP address) of each of the specified file storages from the management storage table 711.

Steps S3107 and S3108 are executed on all of the file storages specified in step S3105 ("specified storages," in the description of FIG. 32) (loop M).

In step S3107, the program 755 executes the information acquisition program 753, whereby an execution instruction to execute the information acquisition response program 703 within the specified storages is transmitted.

In step S3108, the program 755 determines whether the response to the execution instruction indicates normal completion or not.

When the result of the determination made in step S3108 is negative (S3108: No) in terms of at least one of the specified storages, the loop M is ended, and the program 755 outputs (e.g., displays) an error log in step S3111.

When the result of the determination made in step S3108 is positive (S3108: Yes) in terms of all of the specified storages, the loop M is ended, and the program 755, in step S3110, outputs (e.g., displays) the result of the execution (e.g., information complying with the input search condition out of the acquired information).

Figure 32:
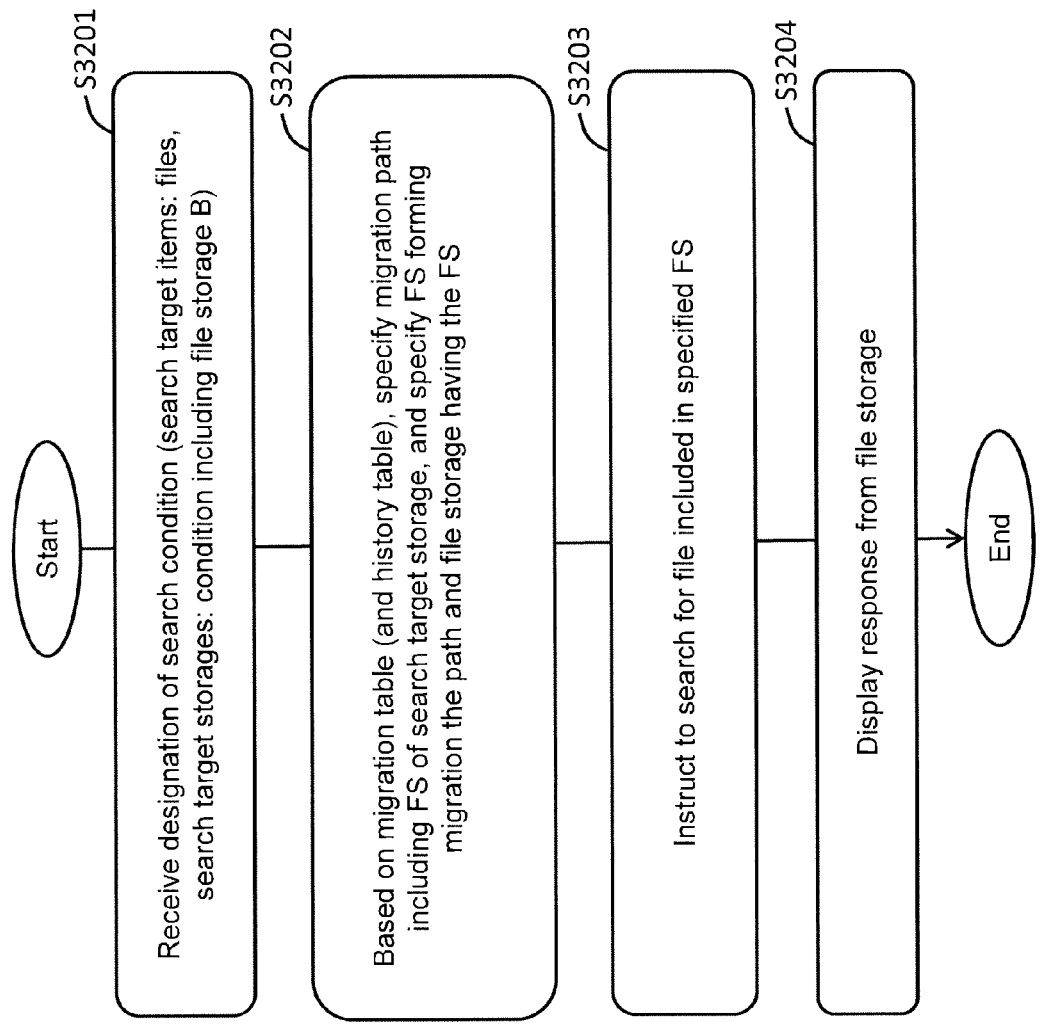
FIG. 32 shows one specific example of a search process.

FIG. 32 shows one specific example of the search process. For example, suppose that the migration path is changed by eliminating the file storage B from the migration path of file system A→file system B→file system C→file system D, prior to the execution of the search processes shown in FIG. 32. In addition, suppose that the file storage A has the file system A, the file storage B the file system B, the file storage C the file system C, and the file storage D a file system D.

In step S3201, the search program 755 receives a search condition. In the search condition, the search target item represents a file, and the search target storage represents the identification information of the file storage B. In other words, this search condition is used for searching, from the file storage system, a file that is previously stored in the file storage B.

In step S3202, the program 755 performs the following processes:

(3202-1) Specifying file systems of the file storage B (and a file system that the file storage B has had before) from the management file system table 773 and all of the history tables associated with the table 773, based on the identification information of the file storage B; and (3202-2) For each of the file systems specified in (3202-1) described above, specifying, from the migration path table 775 and all of the history tables associated with the table 775, a file system that forms each file system and a migration path, and a file storage that includes this file system.

In step S3203, for each of the file systems specified in (3202-2) described above, the program 755 transmits a search instruction to search for a file that is migrated from/to the file systems specified in the above-mentioned (3202-1), to a file storage that has each of the file systems. The file storage that receives this search instruction searches, from the file table 715 of the file storage and all of the history tables associated with the table 715, the file that is migrated from/to the file systems specified in the abovementioned (3202-1), in response to the search condition. In this example, the file system B is specified in (3202-1), and the file systems A, C and D and the file storages A, C and D are specified in (3202-2). Therefore, in step S3202, the file storages A, C and D refer to the file tables 715 thereof and all of the history tables associated with the tables 715, to search for the file that is migrated from/to the file system B, from one or more files (including the stubs) stored in the file systems A, C and D. The file storages A, C and D reply to the management computing system 105 with the search result (e.g., the information on the searched file (e.g., the file name) or a message describing that the file was not found).

In step S3204, the program 755 outputs (e.g., displays) the result of the search instruction transmitted in step S3203, based on the response to the search instruction.

According to this example, a response that indicates the presence of the file corresponding to the search condition might be obtained from the file storages A and C, and a response that indicates the absence of the file corresponding to the search condition might be obtained from the file storage D. Moreover, the file corresponding to the search condition can be a stub in the file storages A and C. In this case, the program 755 can use this stub to access the file corresponding to the search condition.

The above has described one specific example of the search process.

Note in the present embodiment that the management computer 105 may have an input of information that indicates whether or not the reason of deletion of a file system from the migration path (the reason that the migration path is deleted or changed) is due to a problem with a file storages having this file system. In a case where the file system is deleted from the migration path due to a problem (e.g., failure) with the file storage, information (e.g., identification information) on the file storage with a problem may be displayed, or the file may be searched using a search condition that includes this information. By performing a search process based on the search condition that includes the information on the fail storage with a problem, a file, which was previously stored in the file system of the file storage with a problem, can be searched from the file storage system.

Furthermore, the process shown in FIG. 32 is merely a specific example. The present embodiment can realize other types of search processes in place of/in addition to the above-described search process. For example, the following search processes can be realized:

Investigating a transition of a storage utilization ratio based on the history table showing the utilization ratio of each storage;

Searching for the file storage that was recorded in the past and is not included in the current migration path (i.e., searching for the file storage that is not used currently (but was used in the past));

Searching for a number of migrations and/or recalls within each file system (i.e., investigating the number of times files are migrated and/or recalled within each file system); and Searching for a performance value (IOPS, MB/s, etc.) within each file system (i.e., investigating the performance value related to each file system).

Figure 33:
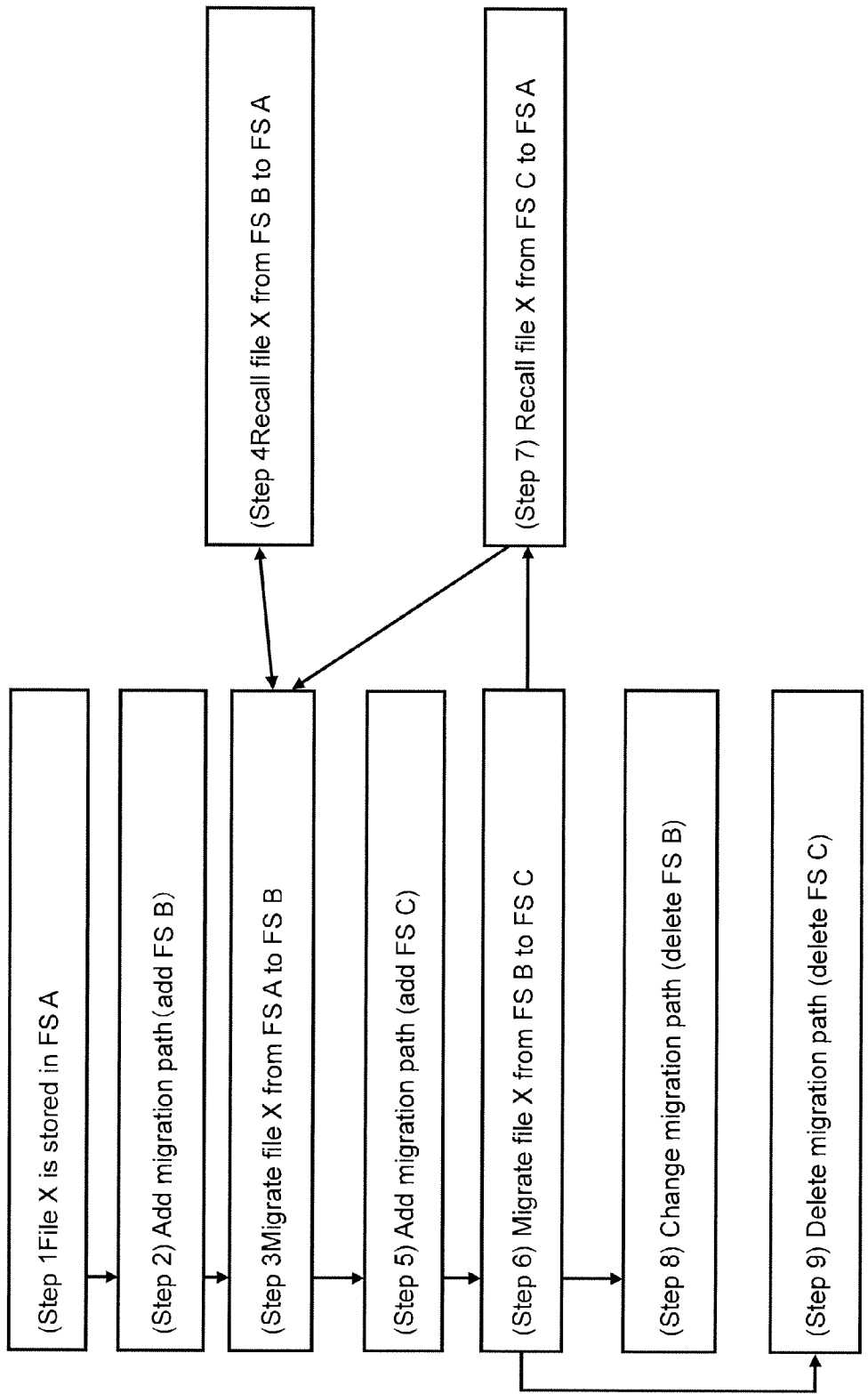
FIG. 33 shows a specific example for illustrating how a file table 715 and history table are updated.

The followings are specific examples including steps 1 to 9 shown in FIG. 33, which are performed when updating the file table of each file storage and the history table:

(Step 1) The file X is stored in the file system A of the file storage A;

(Step 2) A migration path is added (as the terminal end node, the file system B of the file storage B is added to the file system A);

(Step 3) The file X is migrated from the file system A to the file system B;

(Step 4) The file X is recalled from the file system B to the file system A;

(Step 5) A migration path is added (as the terminal end node of the migration path of file system A→file system B, the file system C of the file storage C is added);

(Step 6) The file X is migrated from the file system B to the file system C;

(Step 7) The file X is recalled from the file system C to the file system A;

(Step 8) The migration path is changed (The file system B is deleted from the migration path of file system A→file system B→file system C); and (Step 9) A migration path is deleted (The file system C is deleted from the migration path of file system A→file system C).

FIG. 34A shows a row corresponding to the file X in the file table A (the file table 715 of the file storage A) obtained in step 1 of FIG. 33.

Once the file X is registered in the file system A, the information 1301 to 1303 are registered in the file table A with respect to the file X. However, there are not migration source or migration destination corresponding to the file system A. Therefore, no effective values are set as the information 1304 to 1309.

FIG. 34B shows a row corresponding to the file X in the file table A obtained in step 2 of FIG. 33.

Because the file system B is added as the migration destination corresponding to the file system A, the IP address of the file storage B and the name of the file system B are registered as the information 1306 and 1307 on the migration destination, into a row in the file table A that corresponds to the file X. In addition, the IP address of the file storage B (the name of the file system B) is added to the history table of the information 1306 (1307).

FIG. 35A shows a row corresponding to the file X in the file table A obtained in step 3 of FIG. 33. FIG. 35B shows a row corresponding to the file X in a file table B (the file table 715 of the file storage B) obtained in step 3 of FIG. 33.

Because the file X is migrated from the file system A to the file system B (migration destination), the file X is converted into a stub in the file storage A. As a result, as shown in FIG. 35A, information that indicates the date/time at which the file X is stubbed is recorded as the subbed date/time 1308 in the row corresponding to the file X. In addition, a stubbed date/time that is same as the stubbed date/time 1308 recorded in the row corresponding to the file X is added to the history table corresponding to the stubbed date/time 1308.

Because the file X is stored in the file system B, as shown in FIG. 35B, the information 1301 to 1303 are registered in a row in the file table B that corresponds to the file X. Moreover, the IP address of the file storage A and the name of the file system A are recorded as the migration source information 1304 and 1305, in the same row. The information 1304 and 1305 corresponding to the file X may be written when the file X is received from the migration source.

FIG. 36A shows rows corresponding to the file X in the file table A obtained in step 4 of FIG. 33. FIG. 36B shows a row corresponding to the file X in the file table B obtained in step 4 of FIG. 33.

Because the file X is recalled from the file system B to the file system A, the stubbed date/time 1308 corresponding to the file X is deleted, and information that indicates the deletion of the stubbed date/time 1308 is added to the history table corresponding to the stubbed date/time 1308, as shown in FIG. 36A. As the recalled date/time 1309, information indicating the recalled date/time is also recorded. Information that indicates the same date/time as this recalled date/time 1309 is added to the history table corresponding to the recalled date/time 1309.

Note that, in step 4, the row in the file table B that corresponds to the file X is the same (not changed) as the row obtained in step 3 (see FIG. 35B).

FIG. 37A shows a row corresponding to the file X in the file table A obtained in step 5 of FIG. 33. FIG. 37B shows a row corresponding to the file X in the file table B obtained in step 5 of FIG. 33.

In step 5, the row in the file table A that corresponds to the file X is the same (not changed) as the row obtained in step 3 (see FIG. 35A).

Because the file system C is added as the migration destination corresponding to the file system B, the IP address of the file storage C and the name of the file system C are recorded as the migration destination information 1306 and 1307, in the row in the file table B that corresponds to the file X. In addition, the IP address of the file storage C (the name of the file system C) is added to the history table of the information 1306 (1307).

FIG. 38A shows a row corresponding to the file X in the file table A obtained in step 6 of FIG. 33. FIG. 38B shows a row corresponding to the file X in the file table B obtained in step 6 of FIG. 33. FIG. 38C shows a row corresponding to a file X in a file table C (the file table 715 of the file storage C) obtained in step 6 of FIG. 33.

In step 6, the row in the file table A that corresponds to the file X is the same (not changed) as the row obtained in step 5 (see FIG. 37A).

Because the file X is migrated from the file system B to the file system C, the file X is converted into a stub in the file storage B. As a result, as shown in FIG. 38B, information that indicates the date/time at which the file X is stubbed is recorded as the subbed date/time 1308 in the row corresponding to the file X. In addition, a stubbed date/time that is same as the stubbed date/time 1308 recorded in the row corresponding to the file X is added to the history table corresponding to the stubbed date/time 1308.

As shown in FIG. 380, because the file X is stored in the file system C, the information 1301 to 1303 are registered in the row in the file table C that corresponds to the file X. Moreover, the IP address of the file storage B and the name of the file system B are recorded as the migration source information 1304 and 1305, in the same row.

FIG. 39A shows a row corresponding to the file X in the file table A obtained in step 7 of FIG. 33. FIG. 39B shows a row corresponding to the file X in the file table B obtained in step 7 of FIG. 33. FIG. 39C shows a row corresponding to the file X in the file table C obtained in step 7 of FIG. 33.

Because the file X is recalled from the file system C to the file system A through the file system B, the file table B of the file storage B that has the stub simulating a link of the file X and the file table A of the file storage A that has the stub simulating a link of the stub are updated.

In other words, as shown in FIG. 39B, the stubbed date/time 1308 corresponding to the file X in the file table B is deleted, and information that indicates the deletion of the stubbed date/time 1308 is added to the history table corresponding to the stubbed date/time 1308. In addition, information that indicates the recalled date/time is recorded as the recalled date/time 1309 corresponding to the file X. Information that indicates the same date/time as this recalled date/time 1309 is added to the history table corresponding to the recalled date/time 1309.

Similarly, as shown in FIG. 39A, the stubbed date/time 1308 corresponding to the file X in the file table A is deleted, and information that indicates the deletion of the subbed date/time 1308 is added to the history table corresponding to the stubbed date/time 1308. In addition, information that indicates the recalled date/time is recorded as the recalled date/time 1309 corresponding to the file X. Information that indicates the same date/time as this recalled date/time 1309 is added to the history table corresponding to the recalled date/time 1309.

Note that, in step 7, the row in the file table C that corresponds to the file X is the same (not change) as the row obtained in step 6 (see FIG. 38C).

FIG. 40A shows a row corresponding to the file X in the file table A obtained in step 8 of FIG. 33. FIG. 40B shows a row corresponding to the file X in the file table B obtained in step 8 of FIG. 33. FIG. 40C shows a row corresponding to the file X in the file table C obtained in step 8 of FIG. 33.

Because the migration path is changed (the file system B is deleted from the migration path of file system A→file system B→file system C), the following update takes place.

In other words, as shown in FIG. 40A, in the row in the file table A that corresponds to the file X, the migration destination information 1306 and 1307 are updated from the information on the migration destination file system B obtained prior to the change of the migration path (the IP address of the file storage B and the name of the file system B), to the information on the new migration destination file system C (the IP address of the file storage C and the name of the file system C). In addition, since the link of the stub for the file X is also changed from the file system B to the file system C (i.e., the stub for the file X is updated), the stubbed date/time 1308 is also updated in the row corresponding to the file X in the file table A.

As shown in FIG. 40B, the row in the file table B that corresponds to the file X is the same (not change) as the row obtained in step 6 (see FIG. 38B). The migration source and migration destination information 1304 to 1307 and the stubbed date/time 1308 may be deleted from this row.

Moreover, as shown in FIG. 40C, in the row in the file table C that corresponds to the file X, the migration source information 1306 and 1307 are updated from the information on the migration source file system B that is obtained prior to the change of the migration path (the IP address of the file storage B and the name of the file system B), to the information on the new migration source file system A (the IP address of the file storage A and the name of the file system A).

FIG. 41A shows a row corresponding to the file X in the file table A obtained in step 9 of FIG. 33. FIG. 41B shows a row corresponding to the file X in the file table B obtained in step 9 of FIG. 33. FIG. 41C shows a row corresponding to the file X in the file table C obtained in step 9 of FIG. 33.

In step 9 in which the file system C is deleted, the row in the file table A that corresponds to the file X is the same (not changed) as the row obtained in step 6 (see FIG. 38A), as shown in FIG. 41A.

Also, as shown in FIG. 41B, the stubbed date/time 1308 corresponding to the file X in the file table B is deleted. Because the file X is recalled from the file system C to the file system B, information that indicates the recalled date/time is recorded as the recalled date/time 1309 corresponding to the file X. In addition, because the file system C is deleted, the migration destination information 1306 and 1307 are deleted.

As shown in FIG. 41C, the row in the file table C that corresponds to the file X is the same (not changed) as the row obtained in step 6 (see FIG. 38C). The migration source information 1304 to 1305 may be deleted from this row.

As described above, according to the present embodiment, the file storage system having three or more file storages can be constructed, and, accordingly, a migration path having the intermediate node can be constructed.

The management computer 105 stores the migration path table 755 (the information that indicates the configurations (flows) of all of the migration paths within the file storage system). The management computer 105 further accumulates change histories of the configurations of the migration paths (whether migration paths are added, deleted or changed). Based on the migration path table 775, the management computer 105 can also cause each of the file storages 101 to store the information on the migration destination corresponding to the file system ("target file system" in this paragraph) of each file storage (e.g., the MGD IP address 1306 and MGD FS-name 1307). Each of the file storages 101 can migrate files from the target file system to a migration destination file system that is indicated by the information on the migration destination. Each of the file storages 101 further accumulates change histories of the information on the migration destination (and the migration source) for each file. Based on one or more tables (including the history tables) stored in the management computer 105 and each file storage, the management computer 105 can investigate a file that was previously stored in the file storage designated by the user.

An embodiment of the present invention was described above. However, this embodiment is merely illustrative and does not intend to limit the scope of the present invention. In other words, the present invention can be implemented in various other embodiments. For instance, at least one of the functions of the management computer 105 may be provided to at least one of the file storages 101 of the file storage system in place of/in addition to the management computer 105.

What is claimed is:

1. A file storage system, comprising:
three or more file storage apparatuses; and
a management computer coupled to each of the three or more file storage apparatuses, wherein
(A) the management computer stores therein migration path management information, which indicates a configuration of a migration path capable of including three or more file storage units arranged in a cascade form, and path history information, which indicates a change history of the configuration of the migration path, and
(B) each time when the configuration of the migration path is changed, the management computer is configured to update the migration path management information to information indicating the changed configuration of the migration path, and to add the information indicating the changed configuration of the migration path to the path history information;
wherein
each of the file storage apparatuses is independently configured to store storage unit management information and file management information,
the storage unit management information is information that includes migration destination information on a migration destination file storage unit corresponding to the file storage unit associated with the file storage apparatus having the storage unit management information,
the migration destination information included in the storage unit management information is information that is included in the storage unit management information based on the migration path management information,
the file management information is information on a file that is stored in the file storage apparatus having the file management information and includes the migration destination information, which is information on the migration destination file storage unit to which the file is migrated, and migration source information, which is information on a migration source file storage unit from which the file is migrated,
each of the file storage apparatuses further is independently configured to store migration source history information, which indicates a change history of the migration source information that is included in the file management information of the each file storage apparatus, and migration destination history information, which indicates a change history of the migration destination information that is included in the file management information of the each file storage apparatus, and
the each file storage apparatus is independently configured to:
migrate a file within the file storage unit associated with the each file storage apparatus, to the migration destination file storage unit corresponding to the file storage unit, the migration destination file storage unit being specified from the storage unit management information, and then convert the file into a stub, and
include information on the migration destination file storage unit in the file management information as migration destination information corresponding to the stub, and then add the information on the migration destination file storage unit to the migration destination history information;
wherein
changing the configuration of the migration path involves path change, which is to delete an intermediate file storage unit of the migration path from the migration path,
in the abovementioned (B), the management computer is configured to delete information on the file storage unit to be deleted from the migration path management information, and to add, to the path history information, information that indicates the configuration of the migration path obtained after the path change,
(X) a third file storage apparatus, which is associated with a third file storage unit that is a migration source file storage unit corresponding to the file storage unit to be deleted, is configured to acquire information on a link of a stub of the third file storage apparatus from the file storage apparatus associated with the file storage unit to be deleted,
the management computer is configured to transmit, to the third file storage apparatus, a first path change instruction that includes information on a fourth file storage unit, which is a migration destination file storage unit corresponding to the file storage unit to be deleted, and to transmit, to a fourth file storage apparatus, a second path change instruction that includes information on the third file storage unit, which is the migration source file storage unit corresponding to the file storage unit to be deleted,
the third file storage apparatus is configured to:
receive the first path deletion instruction, and
change the migration destination information corresponding to the stub in the file management information, to the information on the fourth file storage unit that is included in the first path deletion instruction, and add the information on the fourth file storage unit to the migration destination history information; and the fourth file storage apparatus is configured to:
receive the second path deletion instruction, and
change the migration source information corresponding to the file in the file management information, to the information on the third file storage unit that is included in the second path deletion instruction, and add the information on the third file storage unit to the migration source history information.

2. The file storage system according to claim 1, wherein the migration path management information indicates information on configurations of a plurality of migration paths, (C) the management computer is configured to receive a search condition that includes information on a certain file storage apparatus and is used for searching for a file, (D) the management computer is configured to specify, based on the migration path management information, a migration path that includes the file storage unit associated with a target storage, which is the file storage apparatus indicated by the information included in the search condition, (E) the management computer is configured to specify two or more of the file storage apparatuses that are associated with all storage units configuring the migration path specified in the abovementioned (D), (F) the management computer is configured to transmit, to the two or more file storage apparatuses, a search instruction to search for a file that is previously stored in the storage unit associated with the target storage, (G) the file storage apparatuses that receive the search instruction transmitted in the abovementioned (F) are configured to search for the file that is previously stored in the file storage unit associated with the target storage, based on the file management information, the migration source history information, and the migration destination management information, and then to transmit search result information indicating a result of the searching, and (H) the management computer is configured to receive the search result information from each of the file storage apparatuses to which the search instruction is transmitted, and then to output information according to the search result information.

3. The file storage system according to claim 1, wherein changing the configuration of the migration path involves path addition, which is to add a new terminal end file storage unit to the migration path, in the abovementioned (B), the management computer is configured to add, to the migration path management information, information on the file storage unit to be added, and to add to the path history information, information that indicates the configuration of the migration path obtained after the path addition, the management computer is configured to transmit a path addition instruction, which includes the information on the file storage unit to be added, to a first file storage apparatus that is associated with a first file storage unit, which is a migration source file storage unit corresponding to the file storage unit to be added, and the first file storage apparatus is configured to:
receive the path addition instruction, and
include, in the storage unit management information and as the migration destination information corresponding to the first file storage unit, the information on the file storage unit to be added, which is obtained based on the path addition instruction.

4. The file storage system according to claim 1, wherein changing the configuration of the migration path involves path deletion, which is to delete a terminal end file storage unit of the migration path from the migration path, in the abovementioned (B), the management computer is configured to delete information on the file storage unit to be deleted from the migration path management information, and to add, to the path history information, information that indicates the configuration of the migration path obtained after the path deletion, the management computer is configured to transmit a path deletion instruction, which includes the information on the file storage unit to be deleted, to a second file storage apparatus that is associated with a second file storage unit, which is a migration source file storage unit corresponding to the file storage unit to be deleted, and the second file storage apparatus is configured to:
receive the path deletion instruction,
store a file within the file storage unit to be deleted, which is a link for a stub of the second file storage apparatus, in the second file storage unit, which is the migration source corresponding to the file be deleted, and is specified from the file storage unit to be deleted based on the storage unit management information of the second file storage unit, and then delete the stub, and delete the migration destination information from the file management information in terms of the file from which the stub is deleted, and then add information that indicates the deletion of the migration destination information to the migration destination history information.

5. The file storage system according to claim 1, wherein, when the
information acquired in the abovementioned (X) is a stub, the link of the stub of the third file storage apparatus is changed to a link indicated by the acquired stub.

6. The file storage system according to claim 1, wherein each of the file storage units is a file system.

7. A storage control method, which is carried out by a file storage system having three or more file storage apparatuses, the method comprising the step of, each time when a configuration of a migration path capable of including three or more file storage units arranged in a cascade form is changed, updating, using at least one computer coupled to each of the three or more file storage units, migration path management information that indicates the configuration of the migration path, to information that indicates the changed configuration of the migration path, adding, using the at least one computer, the information that indicates the changed configuration of the migration path to path history information that indicates a change history of the configuration of the migration path;

storing, using each of the file storage apparatuses independently, storage unit management information and file management information, wherein
the storage unit management information is information that includes migration destination information on a migration destination file storage unit corresponding to the file storage unit associated with the file storage apparatus having the storage unit management information, the migration destination information included in the storage unit management information is information that is included in the storage unit management information based on the migration path management information, the file management information is information on a file that is stored in the file storage apparatus having the file management information and includes the migration destination information, which is information on the migration destination file storage unit to which the file is migrated, and migration source information, which is information on a migration source file storage unit from which the file is migrated;

storing, using each of the file storage apparatuses independently, migration source history information, which indicates a change history of the migration source information that is included in the file management information of the each file storage apparatus, and migration destination history information, which indicates a change history of the migration destination information that is included in the file management information of the each file storage apparatus;

using each file storage apparatus independently to:
migrate a file within the file storage unit associated with the each file storage apparatus, to the migration destination file storage unit corresponding to the file storage unit, the migration destination file storage unit being specified from the storage unit management information, and then convert the file into a stub, and include information on the migration destination file storage unit in the file management information as migration destination information corresponding to the stub, and then add the information on the migration destination file storage unit to the migration destination history information;

wherein
changing the configuration of the migration path involves path change, which is to delete an intermediate file storage unit of the migration path from the migration path, each time when the configuration of the migration path is changed, using the at least one computer to delete information on the file storage unit to be deleted from the migration path management information, and to add, to the path history information, information that indicates the configuration of the migration path obtained after the path change, using a third file storage apparatus, which is associated with a third file storage unit that is a migration source file storage unit corresponding to the file storage unit to be deleted, to acquire information on a link of a stub of the third file storage apparatus from the file storage apparatus associated with the file storage unit to be deleted, using the at least one computer to transmit, to the third file storage apparatus, a first path change instruction that includes information on a fourth file storage unit, which is a migration destination file storage unit corresponding to the file storage unit to be deleted, and to transmit, to a fourth file storage apparatus, a second path change instruction that includes information on the third file storage unit, which is the migration source file storage unit corresponding to the file storage unit to be deleted;

using the third file storage apparatus to:
receive the first path deletion instruction, and
change the migration destination information corresponding to the stub in the file management information, to the information on the fourth file storage unit that is included in the first path deletion instruction, and add the information on the fourth file storage unit to the migration destination history information; and using the fourth file storage apparatus to:
receive the second path deletion instruction, and
change the migration source information corresponding to the file in the file management information, to the information on the third file storage unit that is included in the second path deletion instruction, and add the information on the third file storage unit to the migration source history information.

8. A management computer, which is coupled to three or more file storage apparatuses, the management computer comprising:
a communication interface device coupled to each of the three or more file storage apparatuses;
a storage resource; and
a controller that is coupled to the communication interface device and the storage resource,
wherein
the storage resource is configured to store migration path management information, which indicates a configuration of a migration path capable of including three or more file storage units arranged in a cascade form, and path history information, which indicates a change history of the configuration of the migration path, and each time when the configuration of the migration path is changed, the controller is configured to update the migration path management information to information indicating the changed configuration of the migration path, and to add the information indicating the changed configuration of the migration path, to the path history information;

wherein
each of the file storage apparatuses is independently configured to store storage unit management information and file management information,
the storage unit management information is information that includes migration destination information on a migration destination file storage unit corresponding to the file storage unit associated with the file storage apparatus having the storage unit management information,
the migration destination information included in the storage unit management information is information that is included in the storage unit management information based on the migration path management information,
the file management information is information on a file that is stored in the file storage apparatus having the file management information and includes the migration destination information, which is information on the migration destination file storage unit to which the file is migrated, and migration source information, which is information on a migration source file storage unit from which the file is migrated,
each of the file storage apparatuses further is independently configured to store migration source history information, which indicates a change history of the migration source information that is included in the file management information of the each file storage apparatus, and migration destination history information, which indicates a change history of the migration destination information that is included in the file management information of the each file storage apparatus, and the each file storage apparatus is independently configured to:
- migrate a file within the file storage unit associated with the each file storage apparatus, to the migration destination file storage unit corresponding to the file storage unit, the migration destination file storage unit being specified from the storage unit management information, and then convert the file into a stub, and
- include information on the migration destination file storage unit in the file management information as migration destination information corresponding to the stub, and then add the information on the migration destination file storage unit to the migration destination history information;

wherein
changing the configuration of the migration path involves path change, which is to delete an intermediate file storage unit of the migration path from the migration path,
each time when the configuration of the migration path is changed, the management computer is configured to delete information on the file storage unit to be deleted from the migration path management information, and to add, to the path history information, information that indicates the configuration of the migration path obtained after the path change,
(X) a third file storage apparatus, which is associated with a third file storage unit that is a migration source file storage unit corresponding to the file storage unit to be deleted, is configured to acquire information on a link of a stub of the third file storage apparatus from the file storage apparatus associated with the file storage unit to be deleted,
the management computer is configured to transmit, to the third file storage apparatus, a first path change instruction that includes information on a fourth file storage unit, which is a migration destination file storage unit corresponding to the file storage unit to be deleted, and to transmit, to a fourth file storage apparatus, a second path change instruction that includes information on the third file storage unit, which is the migration source file storage unit corresponding to the file storage unit to be deleted,
the third file storage apparatus is configured to:
- receive the first path deletion instruction, and
- change the migration destination information corresponding to the stub in the file management information, to the information on the fourth file storage unit that is included in the first path deletion instruction, and add the information on the fourth file storage unit to the migration destination history information; and the fourth file storage apparatus is configured to:
- receive the second path deletion instruction, and
- change the migration source information corresponding to the file in the file management information, to the information on the third file storage unit that is included in the second path deletion instruction, and add the information on the third file storage unit to the migration source history information.

\* \* \* \* \*